(12) United States Patent
Bennett et al.

(10) Patent No.: US 9,118,731 B2
(45) Date of Patent: Aug. 25, 2015

(54) AD HOC SOCIAL NETWORKING

(75) Inventors: James D. Bennett, Hroznetin (CZ);
Yasantha N. Rajakarunanayake, San Ramon, CA (US); Wael W. Diab, San Francisco, CA (US); Jeyhan Karaoguz, Irvine, CA (US); Marcus C. Kellerman, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 203 days.

(21) Appl. No.: 13/351,822

(22) Filed: Jan. 17, 2012

(65) Prior Publication Data
US 2013/0091209 A1    Apr. 11, 2013

Related U.S. Application Data

(60) Provisional application No. 61/545,147, filed on Oct. 8, 2011.

(51) Int. Cl.
| | |
|---|---|
| *G06F 15/16* | (2006.01) |
| *H04L 29/08* | (2006.01) |
| *H04L 12/58* | (2006.01) |
| *G06Q 50/00* | (2012.01) |
| *H04W 4/20* | (2009.01) |
| *H04L 29/12* | (2006.01) |

(52) U.S. Cl.
CPC .............. *H04L 67/306* (2013.01); *G06Q 50/01* (2013.01); *H04L 29/08702* (2013.01); *H04L 51/32* (2013.01); *H04W 4/206* (2013.01); *H04L 61/2528* (2013.01)

(58) Field of Classification Search
None
See application file for complete search history.

(56) References Cited

U.S. PATENT DOCUMENTS

| 7,698,380 B1 | 4/2010 | Amidon et al. |
| 7,853,881 B1 | 12/2010 | Aly Assal et al. |

(Continued)

FOREIGN PATENT DOCUMENTS

| CN | 102196014 A | | 9/2011 |
| WO | WO 2010/023803 | * | 3/2010 |

OTHER PUBLICATIONS

European Patent Office; European Search Report; EP Application No. 12006969.5; Apr. 3, 2013; 3 pgs.

(Continued)

*Primary Examiner* — Joshua Joo
(74) *Attorney, Agent, or Firm* — Garlick & Markison; Edward J. Marshall

(57) ABSTRACT

An Ad Hoc social networking environment enables information and device access management between social networking groups and social networking members with or without access restrictions and anonymity. Contact and access information can be exchanged and updated on the fly without requiring users to notify other contacts or contacting devices and can support underlying contact information changes, enable extemporaneous termination or modification of contact access, enable temporary access, and the like. Ad Hoc social networking can utilize unique identifiers, proxy elements, or the like to support various levels of membership anonymity and Ad Hoc social networking. Proxy elements enable SNET tear down or dissolution by retracting the proxy service from a member. Storing social group contact information in shared databases can enable sharing and updating of contact information without the need to inform affected contacts. Some social networks can include various specialized devices and related services.

20 Claims, 16 Drawing Sheets

(56) References Cited

U.S. PATENT DOCUMENTS

| | | | |
|---|---|---|---|
| 8,117,287 B2* | 2/2012 | Washburn | 709/219 |
| 8,676,891 B2* | 3/2014 | Su et al. | 709/204 |
| 2002/0023132 A1* | 2/2002 | Tornabene et al. | 709/205 |
| 2003/0067887 A1* | 4/2003 | Truetken | 370/261 |
| 2006/0077952 A1* | 4/2006 | Kubsch et al. | 370/351 |
| 2006/0280191 A1* | 12/2006 | Nishida et al. | 370/401 |
| 2007/0083915 A1* | 4/2007 | Janakiraman et al. | 726/4 |
| 2007/0282949 A1* | 12/2007 | Fischer et al. | 709/204 |
| 2008/0133753 A1 | 6/2008 | Clark | |
| 2008/0140650 A1 | 6/2008 | Stackpole | |
| 2008/0222308 A1 | 9/2008 | Abhyanker | |
| 2008/0256107 A1* | 10/2008 | Banga et al. | 707/102 |
| 2009/0307345 A1 | 12/2009 | Carter et al. | |
| 2010/0153285 A1* | 6/2010 | Anderson et al. | 705/319 |
| 2010/0169789 A1 | 7/2010 | Cheng et al. | |
| 2010/0179998 A1* | 7/2010 | Matteini et al. | 709/206 |
| 2010/0257239 A1 | 10/2010 | Roberts | |
| 2011/0119335 A1* | 5/2011 | Galbreath et al. | 709/204 |
| 2011/0131663 A1* | 6/2011 | Kaikuranta et al. | 726/28 |
| 2011/0134806 A1* | 6/2011 | Kagawa et al. | 370/259 |
| 2011/0153740 A1* | 6/2011 | Smith et al. | 709/204 |
| 2011/0173261 A1* | 7/2011 | McCallie et al. | 709/204 |
| 2011/0208868 A1* | 8/2011 | Walsh et al. | 709/227 |
| 2013/0005362 A1* | 1/2013 | Borghei | 455/456.3 |
| 2013/0067594 A1* | 3/2013 | Kantor et al. | 726/28 |
| 2013/0311664 A1* | 11/2013 | Pirnazar | 709/227 |

OTHER PUBLICATIONS

European Patent Office; European Search Report; EP Application No. 12006973.7; May 10, 2013; 3 pgs.

European Patent Office; European Search Report; EP Application No. 12006968.7; Mar. 22, 2013; 3 pgs.

* cited by examiner

AD HOC SOCIAL NETWORKING

CROSS REFERENCE TO RELATED PATENTS/PATENT APPLICATIONS

Provisional Priority Claim

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:
1. U.S. Provisional Patent Application Ser. No. 61/545,147, entitled "Social Network Device Memberships and Resource Allocation," filed Oct. 8, 2011, expired.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention relates generally to social networking, and more particularly to social network device memberships, resource allocation, and related services and communications.

2. Related Art

The popularity and growth of social network sites and services has increased dramatically over the last few years. Existing social network sites include Facebook, Google+, Twitter, MySpace, YouTube, LinkedIn, Flicker, Jaiku, MYUBO, Bebo and the like. Such social networking sites are typically organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to communicate and share activities, interests, opinions, status updates, audio/video content, etc. across networks of contacts. Social networking services might also allow members to track certain activities of other members of the social network, collaborate, locate and connect with former acquaintances and colleagues, and establish new connections with other members.

While social networks are usually comprised of individuals, members might also include companies, restaurants, political parties and event profiles that are represented in a like manner to human members (e.g., profile pages accessible by members of a social network). Individual members typically connect to social networking services through existing web-based platforms via a computing device and/or mobile smartphone. Smartphone and games-based mobile social networking services are other rapidly developing areas.

Social media is often utilized as a method of facilitating a variety of social interactions. When a person meets someone in a social or business setting, for example, that person may desire to exchange a variety of contact information. In addition, a person may desire to provide differing sets of information to different acquaintances (e.g., business contacts, family members, friends, and visitors). Such contact information may include one or more of a person's phone numbers, email addresses; and web page addresses, twitter handles, blog addresses, social network (SNET) handles, VoIP/video call handles, etc. When a change occurs to contact information, it is presently very difficult to convey the information to all other members and member devices, both within and without social networks.

Often, a visitor to a location, network, or the like is granted access to a location, business network, and possibly to a social networking environment, cloud applications, or cloud media content. Such grants are often virtually unlimited in duration and scope. In addition, a social group has a variety of mechanisms for establishing contact with another member, member device, or member device service, including, for example, telephone numbers, IP or other routing addresses, VoIP/video call handles, twitter handles, other SNET handles, blogs, web page addresses, email addresses, etc. When a change the above occurs, it may be difficult to convey the information to all other members and member devices.

DETAILED DESCRIPTION OF THE INVENTION

As used herein, the terms "social network" and "SNET" comprise a grouping or social structure of devices and/or individuals, as well as connections, links and interdependencies between such devices and/or individuals. Members or actors (including devices) within or affiliated with an SNET may be referred to herein as "members", "users", "nodes", "social devices", "SNET members", "SNET devices", "user devices" and/or "modules". In addition, the terms "SNET circle", "SNET sub-circle", "SNET group", and "SNET sub-group" generally denote an SNET that comprises SNET devices and, as contextually appropriate, human SNET members, device SNET members, personal area networks ("PAN"), and the like.

In accordance with the disclosure, a social network-centric basis can be utilized for user contact and device access management, with or without restrictions and various level of user/device anonymity. In this way, and as described more fully below, an entity, which can include, without limitation, an individual, user, social device, SNET group member, some combination thereof, or the like can forward all contact and access information in one event, and can elect to hide or withhold certain information during the process. Underlying access rights/contact information may be provided on the fly without the need to notify contacts, contacting devices, SNET group members, or the like. Further, device access and contact information sharing can be very dynamic and responsive to power up and down (including online status), for example, and may entail rerouting access to a secondary or new device in a non-intrusive or unseen manner. Further, a device owner may boot or restrict access (e.g., do not disturb) manner on a device-by-device and human member-by-member basis.

Figure 1:
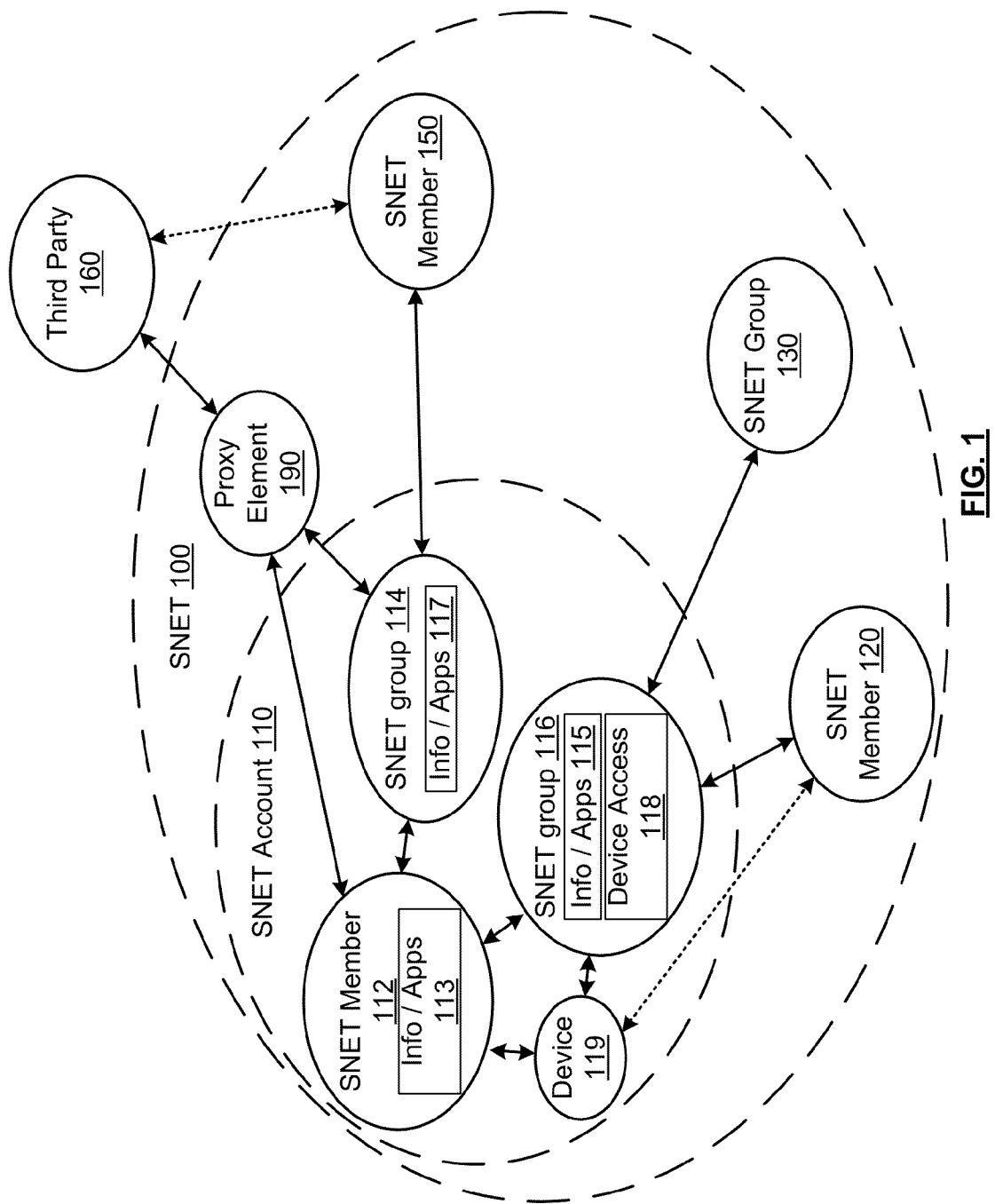
FIG. 1 illustrates an embodiment of a social networking environment according to various embodiments of the disclosure.

Referring first to FIG. 1, an infrastructure including a social network 100 (hereinafter "SNET") comprising various elements is shown. SNET 100 can include various members, groups, accounts, and the like which can interact, become members of various SNET groups, some combination thereof, or the like. As shown in the illustrated embodiment, an SNET 100 can include one or more SNET Accounts 110 which can be associated with one or more SNET users, referred to herein as SNET members, 112. An SNET member 112 associated with an SNET account 110 can interact with the SNET 100 in various ways, including storing, hosting information on SNET 100, enabling access to information, some combination thereof, or the like. In some embodiments, various members and elements of SNET 100 include one or more devices. For example, SNET 100 can be supported by one or more server devices, while one or more SNET members may be associated with, supported by, or the like, one or more various devices.

In some embodiments of the disclosure, phone-to-phone SNET group membership processing is facilitated, in real time, through Ad Hoc access to SNET group profile data. For example, while in a call conversation, an SNET member 112 can press a button on a phone to invite one or more other call participants, such as an SNET member 120, a third-party 160, another SNET group 130, some combination thereof, or the like, to an SNET group 116. This could happen prior to, during or following a call, and may be further conditioned by a proximity determination (with or without secure confirmation). Such an SNET group 116, which may be referred to as an Ad Hoc SNET group 116, may have standard categories of information 115 associated with it, such as business card graphics, curriculum vitae, etc., and may support a variety of associated or docked social devices 119 by providing or enabling access to SNET group 116 members. What information, Device access, or the like that is made available to SNET group 116 members can be determined by SNET member 112 by associating selected information 113, which can include applications, content items, links, contact information, some combination thereof, or the like, Device access information, or the like, to SNET group 116. SNET member access to some or all of one or devices 119 can be enabled via device access information 118, which can include, without limitation, one or more IP addresses, device capabilities, some combination thereof, or the like.

Following a successful exchange, various resources may be made available to SNET group 116 members, including the ability to place phone calls via a variety of means, access to one or more devices 119, such as one or more functional elements of printers, computers, or the like, access to certain information, such as individual product offerings of media content items, text files, software applications, weblinks, contact information, or the like. An SNET member 112 may have various predefined SNET groups 116 and 114, and can determine what information 113, such as contact information, content items, applications, and the like, is made available to certain members of certain SNET groups. For example, SNET member 112 can choose to associate only basic contact information, substitute contact information, some combination thereof, or the like as information 117 that can be accessed by members of SNET group 114, while SNET member 112 can also choose to associate instances of media content items, one or more functional elements of one or more devices 119, and the like as information 115 and device access information, 118, respectively, to be accessible to members of SNET group 116. Device 119 access by SNET group 116 members may not necessarily require accessing device 119 through SNET group 116. For example, SNET member 120 may access device access information 118 that enables the SNET member 120 to access device 119 directly or indirectly over one or more transport media.

In some embodiments, an SNET member 112 who has various SNET groups 114 and 116, can, upon pressing an "invite to SNET group" button or like verbal command on or to a device, can select an entity, such as an SNET member 120, SNET group 130, third party 160, some combination thereof, or the like, to whom an offer to join one or more SNET groups 116 and 114 is to be sent. The SNET member 112 may subsequently receive a password confirmation from a recipient of the offer. A recipient might select "pending" or "accept", and select another SNET or SNET group that could be merged in an SNET group merger. In this manner, an SNET group 130, such as a business contact SNET group, can have a configuration for communications between an SNET group manager, including an SNET member 112 managing the SNET group 116, an SNET member 120 who is a member of the SNET group 116, or the like, and his work acquaintances in a hub-and-spoke arrangement, such that none of the work acquaintances can contact each other through the SNET group 116, but some or all can contact the SNET member 112. In another embodiment, a family or acquaintance SNET group 114 may comprise a "star-like" arrangement whereby all SNET group 114 members 112, 150, and 160 are able to interact with each other. Such interaction may be different for different members of an SNET group. For example a third party 160 who is a member of SNET group 114, but is not a member of SNET 100, may be a "guest", "visitor", or the like and may have limited interaction capabilities with SNET 114, information 117 made available to group members 150 who are SNET members, communications with other group members, some combination thereof, or the like.

In yet another embodiment, an SNET member 112 establishes or receives a unique ID, referred to herein as a unique identifier, a unique handle, or the like, for Ad Hoc social networking opportunities, the unique identifier associated with, identifying, uniquely identifying, or the like, a user-created Ad Hoc SNET group 114. For example, an entity receiving a handle such as "john.brcm-facebook" from the SNET member 112 or some other entity may respond by joining a predefined Ad Hoc SNET group 114 that handles business contacts and business device access. Additional information 117, such as an email address, Skype handle, telephone number, etc., need not be provided to a new Ad Hoc SNET group 114 member 150, as the Ad Hoc SNET group 114 member's 150 communication devices can gain such routing information from the Ad Hoc SNET group 114 either publicly (and perhaps occasionally gather or update information when contacting devices are attached for use in direct contact setup and routing) or privately (via anonymous routing or set-up via a proxy element 190, which may or may not be a part of SNET 100). In some embodiments, a proxy element 190 provides substitute information to one or more members of Ad Hoc SNET group 114, rather than some or all of the information 117 associated with the Ad Hoc SNET group 114. The substitute information, can route communications between one or more Ad Hoc SNET group 114 members through a similar or different proxy element 190, provide partial or full anonymity of contact information associated with one or more Ad Hoc SNET group 114 member, enable transparent updating of contact information without updating all Ad Hoc SNET group 114 members, prevent some or all members of Ad Hoc SNET group 114 from having access to actual contact information, source information associated with one or more devices, actual locations of information, some combination thereof, or the like.

In an embodiment, an SNET member 112 may form an Ad Hoc SNET group 114 identified as "business card", and associate some or all of his own information 113, including, without limitation, his/her work cell phone, VoIP handle, and work email as information 117 associated with the group (it is noted that email accounts, Skype accounts, etc., may also act as SNET/Ad Hoc SNET group members). The SNET member 112 may also choose to associate a tailored, work-related CV profile as part or all of information 117 associated with the Ad Hoc SNET group. If desired, the SNET member 112 may also select anonymity for some or all information 117, including contact information, associated with the Ad Hoc SNET group 114. Next, the SNET member 112 can associate the Ad Hoc SNET group 114 with a handle that may be unique to the business card SNET group 114 (i.e., a unique identifier). This SNET handle can then be printed on a business card (which may not have further contact information printed thereon), exchanged via a handshake, handwritten, exchanged with one or more various acquaintances 150, 160, or the like, via one or more various transport media, some combination thereof, or the like. Later, via the SNET 100, the SNET member's 112 acquaintance 150 can attempt to add the SNET handle, the SNET group 114 that it identifies, or the like into his own SNET handle/SNET group, and the SNET member 112 can service the attempt by accepting or rejecting the attempt. Upon acceptance, a contact pathway (perhaps with anonymity) is established such that the acquaintance 150, his SNET group, or the like has "joined" the Ad Hoc SNET group 114. In some embodiments, a joined acquaintance 160, as a member of the Ad Hoc SNET group 114, can only call the user via the Ad Hoc SNET group's 114 anonymous call setup support, which can include or be part or all of a proxy element 190, which may or may not be part of SNET 100. Similarly, email contact may be conducted via the Ad Hoc SNET group's 114 handle, with integrated forwarding and replies via a similar or different proxy element 190, without exposing actual email addresses of one or more SNET members to other members of Ad Hoc SNET group 114.

Figure 2:
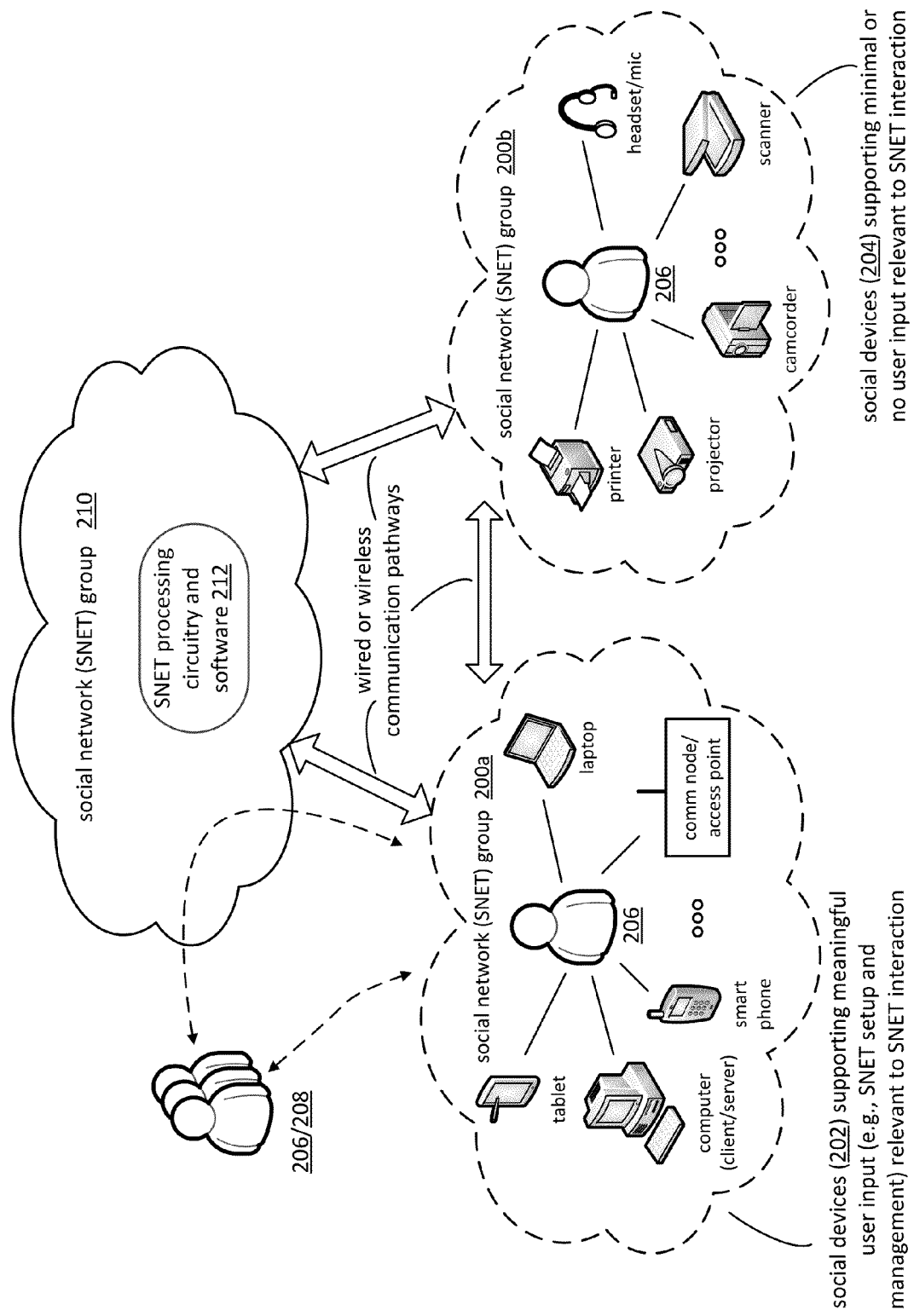
FIG. 2 illustrates social device membership and access in a social network according to various embodiments of the disclosure.

FIG. 2 illustrates various embodiments of social device membership and accessibility in social network groups according to various embodiments of the disclosure. In this embodiment, membership in an SNET group 210 may be extended to encompass public and private social devices and equipment. For example, in an SNET group 210 that includes human members/users 206/208, each human user may have a respective personal SNET sub-group 200(a)/200(b) of associated or docked social devices 206/208 capable of independent or aggregated participation in the SNET group 210. The SNET sub-group may be locally or remotely accessible by a human user 206/208 and/or other SNET group/sub-group users through various means, such as clicking on an icon or tag associated with the human user/personal sub-group. In some embodiments, SNET group 210 can be organized to permit some or all members, including human users 206/208, social devices 202/204, SNET subgroups 200a/200b, and the like to communicate with each other. SNET group 210 can also be organized to enable SNET group 210 members to communicate with only one particular SNET sub-group 200a/200b, human user 206/208, SNET processing circuitry and software 212, one or more social devices 202/204 some combination thereof, or the like.

Although SNET sub-groups 200(a) and 200(b) are illustrated as separate sub-groups, such sub-groups may instead comprise a single SNET group or sub-group, or any number of additional SNET groups and/or sub-groups, each of which may include various combinations of social devices 202/204. Further, SNET processing circuitry and software 212 of the illustrated embodiment manages formation and operation of the SNET group 210. The SNET processing circuitry and software 212 may be incorporated in a standalone server, one or more social devices, and/or cloud-based resources. The SNET group 210 may be persistent or of limited duration, and include ad hoc and/or static associations.

Social devices 202/204 may be broadly categorized as social devices 202 that include a user or SNET group interface sufficient to provide meaningful input to SNET interaction, social devices 204 that support minimal or no user input relevant to SNET interaction, or the like. More particularly and without limitation, the first category may include computers, tablet devices, IPTVs, IPTV set top boxes, smart phones, servers, laptops, cloudbooks, network attached storage devices, gaming consoles, media players/sources, communication nodes (access points, routers, switches, gateways, etc.), user interface devices, power line communication (PLC) devices, etc. Such social devices may receive user input for SNET setup and management. The second category may include, again without limitation, printers, projectors, cameras and camcorders, scanners, speakers, headsets, smoke detectors, alarm systems, video cameras, mice, etc. In general, docket social devices include any electronic device that could be operably coupled to or docked in an SNET group/sub-group via wired or wireless pathways to participate as an SNET user.

As will be appreciated, by docking social devices, users of an SNET group 210 may gain full or partial remote control and interaction such devices via an authorized user SNET account. For example, family members authorized to participate in a "family" SNET group may remotely access docked social devices via one or more associated SNET accounts. As will be discussed below, users of an SNET group 210 may maintain databases containing information associated with other users of SNET group 210. Such information may be stored or hosted in databases in SNET sub-groups 200a and 200b, with updates to individual databases being distributed to other SNET sub-groups periodically, via user input, or in response to an update. A central copy of a database may be stored or hosted at SNET processing circuitry and software 212, which can receive updates from various users, devices, SNET groups 200, or the like and distribute updated databases back to the various users of SNET group 210.

Figure 3:
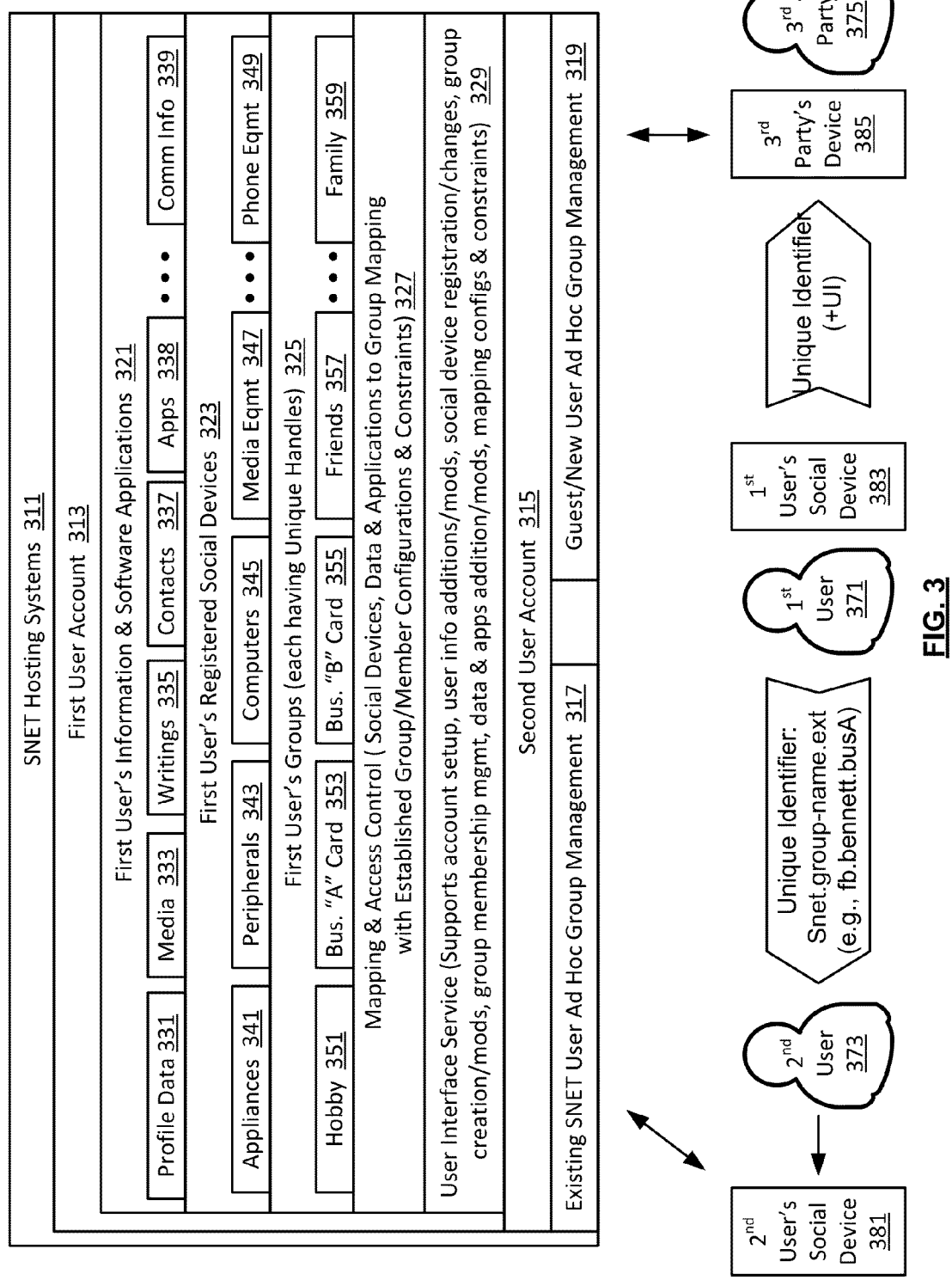
FIG. 3 illustrates Ad Hoc Social Networking environments according to various embodiments of the disclosure.

FIG. 3 illustrates an embodiment of an environment supporting Ad Hoc membership in Ad Hoc SNET groups for both existing SNET members, new SNET members, third-parties, and the like. Ad Hoc SNET groups can enable an SNET member to enable others to gain quick, on the fly access to certain information associated with the SNET member while maintaining control over the access, such that control can be expanded, restricted, terminated, or dropped quickly and selectively.

An Ad Hoc SNET group membership and information associated with the group can be managed via an SNET hosting system. As shown in the illustrated embodiment, an SNET hosting system 311 can include accounts for members of the SNET. Each member's account can include entries for information 321, social devices 323, and the like associated with the member, registered with the SNET, and the like, which the member can selectively choose to include in one or more Ad Hoc SNET groups 325. Using various controls and interfaces, e.g. user interface service 329, a member can control what information, devices, and the like can be accessed by members of the SNET member's Ad Hoc Groups, add or remove information, devices, and the like from the hosting system 311, modify, add, or terminate Ad Hoc SNET group members, and the like.

The illustrated embodiment shows SNET accounts 313 and 315 for a first and second SNET user 371 and 373, respectively. Other embodiments can include additional accounts for additional SNET members, which can include, without limitation, full SNET members, restricted SNET members, new SNET members, guest SNET members, some combination thereof, or the like. The first user 371 account 313 is illustrated in an expanded view to illustrate the information, services, and the like available to an SNET member; other SNET members, such as the second SNET member's account 315, can have similar features.

The first user 371's account 313 can include an entry 321 dedicated to information and applications related to the first user 371. The information and applications can include, without limitation, information and applications that the first user 371 collected, bought, created, gained access to, or the like. The information, applications, and the like can be detailed, listed, stored, or the like in slots 331-339. Information associated with the first user 371 can include, without limitation, information regarding the first user 371's one or more SNET profiles 331, media 333, writings 335, associated contacts 337, applications 338, and the like. Profile data slot 331 can include information related to the first user 371's profile for one or more SNETs in which the first user 371 is an SNET member, such as profile handles, passwords, home page links, and the like. Media information slot 333 can include information detailing media content items, or portions thereof, that the first user 371 has created, acquired, or the like, such as titles, run-time, metadata, the actual media content items themselves, or the like. For example, where the first user 371 is a musical composer, media information 333 may include some or all of the musical works created by the first user 371. Writings information slot 335 can include information detailing writings created, acquired, or the like by the first user 371, including, without limitation, blog posts, articles, e-novels, and the like. Contacts information slot 337 can include contact information for certain individuals and entities including, without limitation, phone numbers, email addresses, mailing addresses, unique identifiers for certain SNETs, and the like. Applications information slot 338 can include information detailing certain applications, such as software programs, processes, or the like.

All of the above slots 331-338 can include information detailing certain items, the items themselves, or the like. For example, the media slot 333 can include links for access to some or all of a selection of media content items. However, each item detailed in each information slot 331-338 may be located in different places on the planet. For example, the various media content items listed, detailed, or the like in slot 333 may be located on separate file servers, computing networks, devices, or the like around the world, while the various writings detailed, listed, or the like in slot 335 may be located on different websites, servers, or the like. The location of the various information detailed, listed, or the like in slots 331-338 may be located in a separate slot for communications information 339 necessary to access the desired information detailed, listed, or the like in slots 331-338, including Universal Resource Locator (URL) addresses, weblinks, passwords, access protocols, or the like.

Slots in entry 321 can be added, modified, or removed as the first user 371, another SNET member, the SNET hosting system 311, or the like may see fit. For example, the first user 371 can create a new slot dedicated to media content items that are related to the first user 371's family members, for ease of identification and access.

The first user 371's account 313 can include an entry 323 dedicated to social devices related to the first user 371. These social devices can be registered with the SNET hosting system 311, some other SNET, or the like. Entry 323 can include slots 341-349 dedicated to various devices, to which the first user 371 may have exclusive control, partial control, or the like and which may be capable of participation or interaction with the SNET. Such devices can include various appliances 341, peripherals, 343, computers 345, media equipment 347, phone equipment, and the like. Information included in each slot can include the necessary information to access certain functional elements of one or more devices, enable communications between an SNET member and the SNET via one or more device, some combination thereof, and the like.

The first user 371's account 313 can include an entry 325 dedicated to Ad Hoc SNET groups. These Ad Hoc SNET groups can be created, managed, and the like by the first user 371, individually or cooperatively with another one or more SNET members, the SNET itself, and the like. The first user 371 can add, create, modify, or otherwise interact with Ad Hoc SNET groups in entry 325. The first user 371 can create an Ad Hoc SNET group to other entities associated with various interests and purposes. The first user 371 can also enable Ad Hoc SNET group members to gain access to some or all of certain information 321, devices 323, some combination thereof, or the like. For example, one Ad Hoc SNET group 351 could be dedicated to one or more of the first user 371's hobbies. If the first user 371 is a model rocketry enthusiast, and has extensive writings 335 and media content items 333 related to construction and operation of model rockets, the first user 371 may wish to enable members of his Hobby Ad Hoc SNET group 351 to be able to access his rocketry articles, videos, and the like. Furthermore, the first user 371 may wish to enable members of his Ad Hoc SNET group to operate a model rocket launch pad device via his Hobby SNET. However, the first user 371 may desire that the members of his Hobby Ad Hoc SNET group 351 be unable to access any other information or devices, such as his music collection, HDMI television, or the like. Using a Mapping and Access Control system 327, the first user 371 can selectively control what information, devices, and the like members of certain Ad Hoc SNET groups 351-359 can access by mapping, or associating, certain information 321, devices 323, and the like to/with certain Ad Hoc SNET groups 325. The first user 371 can set a default level of access for a certain one or more Ad Hoc SNET groups, including no access to any information or device, access to certain information or devices, full access to all registered devices and information, some combination thereof, or the like. In addition, access to information and devices by SNET members can be controlled on a member-by-member basis. For example, the first user 371, being a prudent model rocketry enthusiast, may desire that only certain, highly-trusted members of his Hobby Ad Hoc SNET group have access to control his model rocket launch device. The first user 371 may restrict default access by members of the Hobby SNET 351 to certain information only, and give those trusted individuals expanded access to include the launch device. Changes in access for some or all Ad Hoc SNET group members can be transparent to all members.

The first user 371 can also use the SNETs 351-359 to create various groups dedicated to various levels and elements of the first user 371's information and device access. For example, the first user 371 may desire that some of his work colleagues have continuous access to his daytime work telephone and email address, but nothing else, while some trusted work contacts should also have access to his cell phone, friends should have access to his home phone, and family members should have full access to all of his contact information. To address this issue, the first user 371 can create an SNET dedicated to each level of access, thereby providing each member of a respective SNET a certain level of access to the first user 371's information and devices, essentially functioning as a virtual "business card", as set by default, SNET logic, or the first user 371 in the mapping and access control system 327. For example, an "A" Business Card SNET 353 might be mapped or associated with "basic" work contact information for daytime contact, a "B" Business Card SNET 355 for more extensive work contact information for 24/5 contact, a Friends Card SNET 355 for extensive 24/7 contact, and a Family Card SNET 359 for complete 24/7 contact. As discussed above, the first user 371 can modify individual access of individual members of each SNET as the first user 371 so chooses.

In some embodiments, one or more of a user's Ad Hoc SNET groups can have one or more unique identifiers associated with the Ad Hoc SNET group. Each handle can uniquely identify an Ad Hoc SNET group against all other Ad Hoc SNET groups and can be generated automatically by SNET hosting system 311, manually by user input, some combination thereof, or the like. The unique identifier can be in a textual or some other easily interpretable form, an alphanumeric code, or the like. The unique identifier can also identify the Ad Hoc SNET group by observation. For example, a unique identifier for Ad Hoc SNET group 353, where the SNET is Facebook and the first user 371 is named "Bennett", may read "fc.bennett.busA", thereby identifying the SNET, the user, and the Ad Hoc SNET group 353 within the handle. The unique identifier can be used by a user to add members in an Ad Hoc manner quickly, and on the fly. For example, first user 371 can pass a unique identifier associated with a particular Ad Hoc SNET group to other users, entities, or the like that first user 371 wishes to add to the particular Ad Hoc SNET group.

Upon receipt of a unique identifier, a user can join the SNET by entering the unique identifier into the SNET. For example, if first user 371 meets second user 373 and wishes to add second user 373 to his Business "A" Card SNET group 153 to give him basic access to his daytime work contacts, first user 371 can exchange the unique identifier associated with the Business "A" Card SNET group 353 with second user 373. The unique identifier can be exchanged on a card, verbally, via an email, text message, or some other transport medium. The unique identifier can also be exchanged with a password, time-dependent key, or the like that a recipient of the unique identifier must utilize to join the Ad Hoc SNET group. Where second user 373 is a member of the SNET, second user can use the unique identifier to join the Ad Hoc SNET group by entering the unique identifier into his own social device 381, some other social device, by logging into his SNET account and providing the unique identifier, some combination thereof, or the like. Unique identifiers provided by a receiving SNET member, such as second user 373, can be received in the SNET hosting system via a module 317 that manages membership for existing SNET members. For example, if an existing SNET member 373 enters the unique identifier for first user's 371 SNET 153 into an interface on his social device 381, an SNET interface, or the like, module 317 can automatically add second member 373 to SNET 153 and provide the default level of access, specified level of access for new Ad Hoc SNET group members, or the like as specified by Mapping and Access control 327.

In some embodiments, a user can invite individuals and entities who are not currently members of the SNET to an Ad Hoc SNET group. For example, first user 371 may desire to add third party 375 to his Ad Hoc SNET group 351. First user 371 can provide the unique identifier for the particular Ad Hoc SNET group, as well as instructions, information, or the like necessary for third party 375 to find and access the proper SNET. Such information and instructions, as well as the unique identifier, can be provided to third party 375 directly, by verbal instruction, by pushing the unique identifier and a link from first user's device 383 to third users' 375 device 385 over a transport medium, or the like. For example, first user 371 may be on a phone call with third party 375 and may push a button on device 383 to transmit an invitation to Ad Hoc SNET group 351 to third party 385. The invitation may comprise the unique identifier for SNET 351, a weblink to the SNET, and the like and may be sent as a text message, email, or the like, via a wireless connection, such as BT, WiFi, Near-Field, handshaking, device-to-device contact, or the like. Upon following the weblink, third party 375 may be presented with an interface in which third party can join the SNET and join the Ad Hoc SNET group 351 as a new member, join the SNET 351 as a non-member of the SNET, a guest member, or the like. Guest members can be under certain restrictions not imposed on full SNET members. For example, guest memberships can be time-limited, with an option to be made permanent if the guest membership is converted to a full SNET membership, or the like. Adding and managing new or non-SNET member of Ad Hoc SNET groups can be managed through a module 319 separate from the module 317 that manages SNET members.

In some embodiments, a user who is a member of an SNET group, which can be an Ad Hoc SNET group, can give a nonmember, referred to herein as a third party, guest, visitor, or the like, access to at least some information associated, mapped, or the like with the SNET group. For example, the user may associate media content items with a "Family media" SNET group, and the user may desire to give a friend access to at least the media content items. The user's social device can also, or alternatively, be a member of the SNET group. The user can interact with the SNET group via an interface on the user's social device to send the friend, directly, via a device supporting the friend, or the like, an invitation to join the SNET group. The user, social device, or the like can also provide a unique identifier that uniquely identifies the SNET group. The friend can utilize the invitation, unique identifier, or the like to join the SNET group as an ad hoc member and participate in it by interacting with the user's social device (which acts as an access point) via the friend's device, via an independent pathway, or the like. Participation can include accessing some of the media content items associated with the SNET group, all media content items, some or all other information or device functional elements, or the like. The friend's ad hoc membership in the SNET group can be terminated, restricted, or the like by the user, user's device, or the like at any time, in response to one or more trigger events, or the like. For example, upon detecting that the friend's device has moved a certain threshold distance from the user's social device, the social device may automatically, without the user's intervention, terminate or restrict the ad hoc membership of the friend, the friend's device, or the like in the SNET group.

Figure 4:
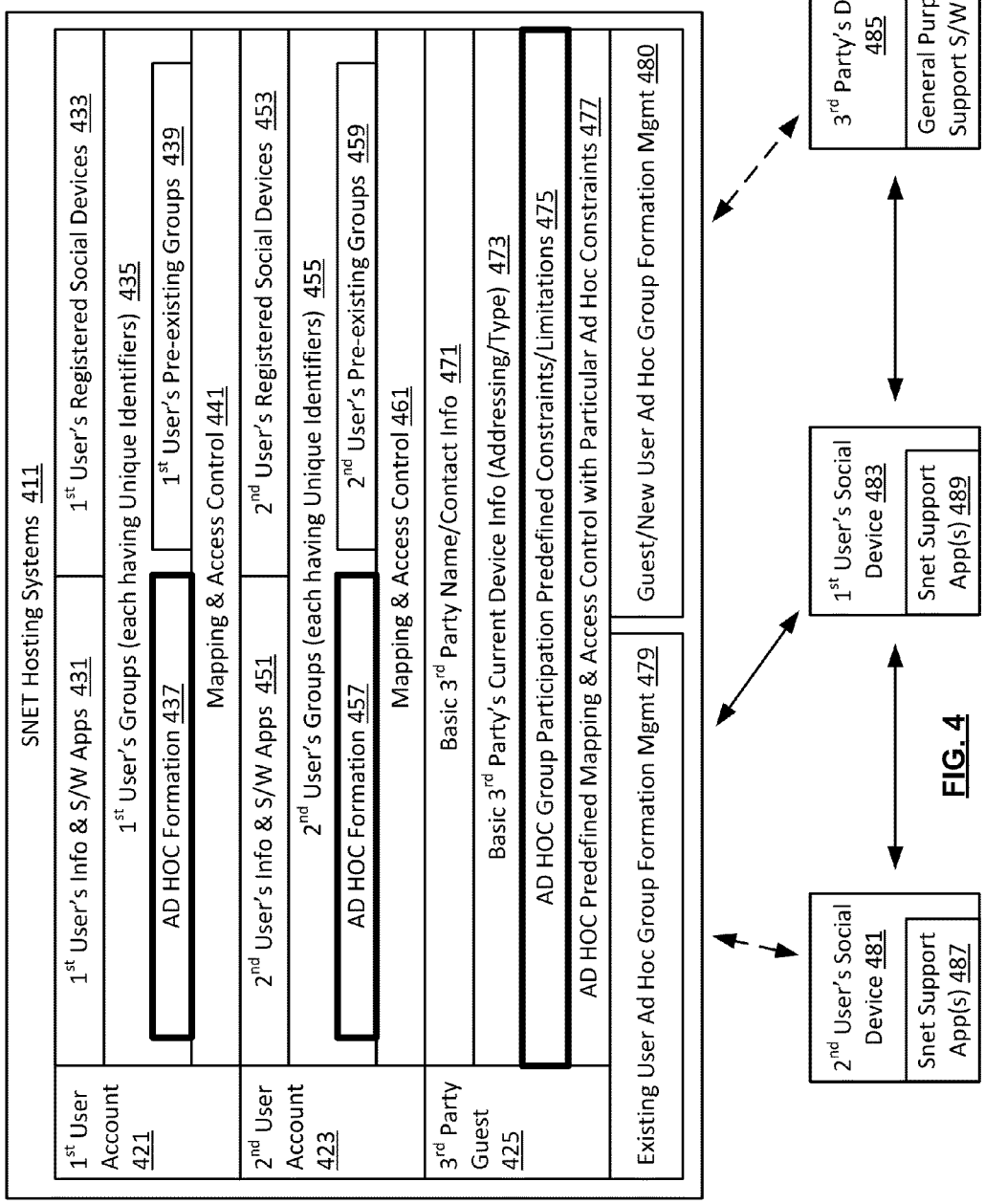
FIG. 4 illustrates Ad Hoc Social Networking environments according to various embodiments of the disclosure.

FIG. 4 illustrates an embodiment of an environment supporting Ad Hoc SNET group formation for both existing SNET members, new SNET members, third-parties, and the like. As described above, embodiments of the disclosure can enable a user to add members to an Ad Hoc SNET group quickly and on the fly. In some embodiments, the Ad Hoc SNET groups themselves can be created quickly and on the fly, enabling a user to create an Ad Hoc SNET group, acquire a unique identifier for the group, and provide that unique identifier to others to quickly join the Ad Hoc SNET group.

Each SNET member can have access to SNET functionality that enables the member to create an Ad Hoc SNET group. For example, in the illustrated embodiment, SNET Hosting System 411 includes accounts for both SNET members and third-party non-members that enable at least some access to Ad Hoc SNET group functionality. Full SNET members, including, without limitation, a first and second user, may have access to Ad Hoc SNET group formation controls 437/457, respectively. Such functionality may be located in an Ad Hoc SNET group management system 435/455, respectively, which enable a full SNET member to both create 437/457 new groups and manage 439/459 existing Ad Hoc SNET groups that the member created, has some level of control over, or the like. Such controls over new and existing groups can include utilizing mapping and access controls 441/461 to add, remove, or otherwise modify user information 431/451 associated with an Ad Hoc SNET group. For example, a first user can access his account 421, form a new Ad Hoc SNET Group 437, and map, or associate, certain items of the first user's information 431 and access to/with some portions of some of first user's devices 433; and a second user can use his account 423 to add, remove, or otherwise modify access controls 461, information 451, and device access 453 to one or more Ad Hoc SNET groups 459 that the second user created previously.

In some embodiments, users who are not SNET members can have a third-party account, guest account, or the like. The abilities that such a third party can exercise through the third-party account may be significantly limited from the abilities provided to full SNET members. For example, as shown in the illustrated embodiment, a third party has a guest account 425. Through this account, a third party can provide and store basic contact information, provide information related to one or more current devices to be associated with the third party, and controls for participating 475 with, and managing access 477 to, one or more Ad Hoc SNET groups, which may be created by one or more of the first or second user. The third party's access to Ad Hoc SNET groups can be restricted to participation only, such that the third party cannot make any contributions, changes, or the like to the Ad Hoc SNET group. In some other embodiments, third-party access may be subject to change by full SNET members, equivalent to that given to full SNET members, or the like. For example, where an SNET group is managed by the SNET, or by no SNET members, a third-party member may have equal access to the SNET group as a full SNET member.

In some embodiments, an SNET member can quickly create an Ad Hoc SNET group and exchange information needed to enable others to join the Ad Hoc SNET group. For example, a first user can decide to set up an event several days in the future and invite a second user and a third-party member to the event. To this end, the first user can access his account 421, access the Ad Hoc SNET group formation functionality 437, and create a basic Ad Hoc SNET group. The basic group requirements may be nothing more than a title, such as "Next Week Event", for the group, such that the first user need to waste time, at least initially, specifying the levels of access afforded to certain SNET group members, nor what information and/or device access is to be provided to SNET group members. Such details can be provided by the first user at a later date.

Upon creating a basic Ad Hoc SNET group, the first user can receive a unique identifier that is associated with the Ad Hoc SNET group. The unique identifier may be created automatically, the first user may be invited to develop the unique identifier himself, some combination thereof, or the like. Once the first user has a unique identifier associated with the Ad Hoc SNET group, the first user can invite others to join the SNET group. For example, the first user can receive the unique identifier on his social device via an Ad Hoc SNET group formation/management module 479, a request from an SNET support application 489 located on his social device 483, some combination thereof, or the like.

Invitations to a newly-formed Ad Hoc SNET group may proceed similarly to that described above in FIG. 3, or they may proceed differently as described below, or the like. For example, the first user, having just created a basic Ad Hoc SNET group, can exchange a unique identifier identifying the new SNET group with a second user's social device 481 to invite him to the Ad Hoc SNET group. The second user may have to enter the unique identifier into a field in the SNET, the unique identifier may be a weblink that, upon being clicked, automatically lead the SNET to join the second user to the Ad Hoc SNET group, or the second user's social device 481 or existing SNET support application 487 can automatically, upon receipt of the unique identifier from the first user, register the second user with the Ad Hoc SNET group. In some embodiments, where first user desires to invite a third-party member ("third party") to the Ad Hoc SNET group, the first user may forward a copy of the unique identifier to the third party, along with a basic support application, software, or the like. The third party can receive the unique identifier and application on his device 485 and can follow received instructions or weblinks to join the Ad Hoc SNET group as a guest member via an Ad Hoc SNET group guest member management module 480, or the like. In addition, the basic support application 491, once installed, may automatically, without user intervention, or the like register the third party as a guest member of the Ad Hoc SNET group. Such a registration can lead to the third party gaining a guest SNET account 425, which can be under one or more instructions beyond those imposed on full SNET members. For example, the guest account can be time-limited, and can expire upon elapse of a certain amount of time.

In some embodiments, an SNET group, including an Ad Hoc SNET group, can be created quickly and on the fly by nonmembers, referred to herein as third parties, visitors, guests, and the like. For example, a nonmember may, upon meeting another nonmember, desire to create an SNET group for friends of the nonmember, even though neither nonmember is a member of the SNET, has a pre-existing SNET group, or the like. Ad Hoc SNET group creation can be facilitated by one or more of the nonmembers interacting with the SNET to set up, as a guest member of the SNET, an Ad Hoc SNET group, and then offering membership, including Ad Hoc membership, in the SNET group to one or more other members, nonmembers, or the like. The offer of membership can be made directly, via device-to-device interaction between the devices of the members and nonmembers, via an independent Internet pathway to the SNET via utilization of a unique identifier uniquely identifying the SNET group, some combination thereof, or the like. The creator of the SNET group may receive a unique identifier which he can deliver to other members and nonmember to utilize to join the SNET group; the creator may also create some or all of the unique identifier and direct that it uniquely identify the SNET group. Once the membership, including Ad Hoc membership, of the one or more nonmembers, members, or the like is accepted, the SNET group members can interact via the SNET group.

In some embodiments according to the disclosure, a SNET group contact proxy element can be provided to support varying levels of SNET group membership anonymity. As described above, an SNET group may employ a variety of addressing mechanisms for establishing contact with another SNET group member, member device, member device service, or supporting software AI (e.g., telephone numbers, IP or other routing addresses, VoIP/video call handles, email addresses, etc.).

In some embodiments, a contact database hosted by a SNET group (perhaps even as a group member with AI) is provided that allows each SNET group member, human member, member devices, services, AI's, or the like to maintain a database that includes respective contact information, along with an anonymity sub-table identifying anonymity across all SNET group membership, across some or all SNET groups, across a single SNET group member and all of his/her member devices, as applied to a single device, etc. Without anonymity, any SNET group member might freely retrieve full contact information for any other member, user, or the like. With anonymity, a proxy element may be configured monitor packet flow and perform middle-man readdressing. For example, for transfers from an anonymous first device to a public second device, direct packet routing can occur, while reverse transfers may flow through a proxy element that monitors communications and performs substitute addressing and forwarding. The master anonymity database may be retrieved in whole or in part and stored in a local database counterpart within a particular member device for subsequent use. Updates may be performed as described below in FIG. 6. Further, anonymous contact information may require a proxy contact information substitute information.

In some embodiments, a user may desire to terminate/relinquish access by the user, another member, or the like to an SNET group. In conjunction, the individual may desire to change information associated with the SNET group, including, for example, contact information, which may result in automatic changes to what information can be accessed by SNET group members. When dropping an acquaintance from an Ad Hoc SNET group, for example, a user could change what devices, telephone numbers, or the like are associated with the SNET group, with this fact blocked from the acquaintance. The acquaintance (perhaps following a boot operation) thereby has limited or no current contact information.

Other situations that might induce a user to terminate an SNET group SNET group membership/contact, or the like can include a change in job (the user drops all business card contacts related to a previous job) or a departing visitor (the visitor's membership is automatically terminated, local access is terminated, authorization to utilize a proxy element, or the like) following a specified time period. Beyond business card-like SNET groups, other SNET groups can operate similarly. For example, upon joining a company, an individual may establish numerous social relationships within such company's SNET infrastructure, SNET groups, or the like relating to work, which the individual may later wish to terminate upon leaving the company. The company's SNET group manager may also boot/remove the individual from some or all SNET groups, and all contact information associated with the individual may disappear from the SNET groups.

Figure 5:
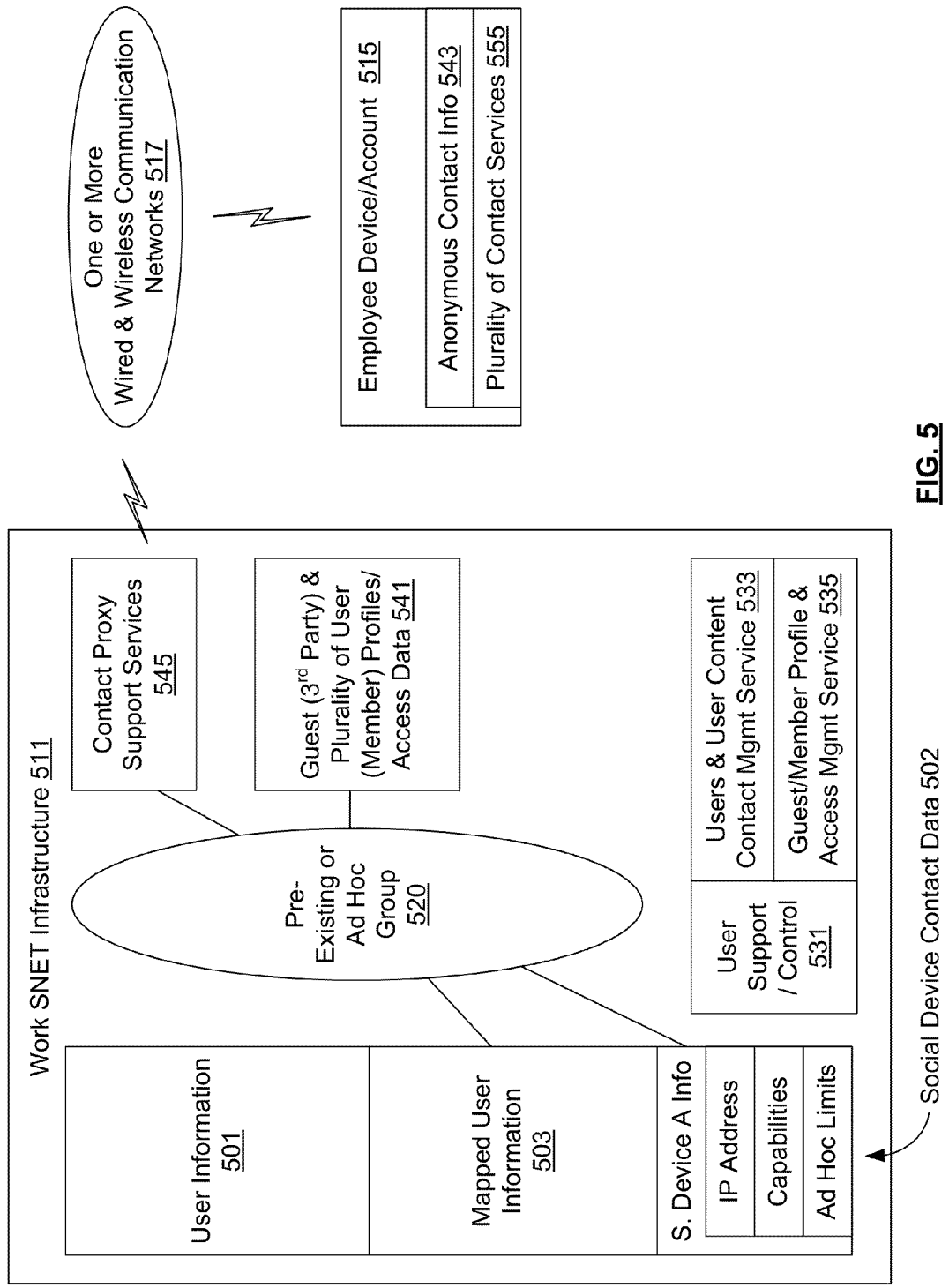
FIG. 5 illustrates Social Networking environments according to various embodiments of the disclosure.

FIG. 5 illustrates an embodiment of an SNET environment supporting access, and management thereof, to information and device functionality via an Ad Hoc SNET group and proxy element. As discussed above, a user may wish to restrict what information and functionalities are made available to the members of one of his Ad Hoc SNET groups. For example, the user may wish to restrict some or all group members from knowing the user's "real" contact information, such as his phone number, email address, and the like. In addition, the user may wish to prevent members that access applications or information that is located in various places from knowing the true location, virtual or otherwise, of the information, applications, and the like. The user may also wish to ensure that those members that are allowed to access his true information have up-to-date information, such as the user's current phone number, email address, webpages, and the like. A user can map, or associate, information and device functionality access to/with one or more Ad Hoc SNET groups to enable SNET members, third-party members, some combination thereof, or the like to access the information, functionality, and the like. In the illustrated embodiment, SNET infrastructure includes a user's information 501, which can include, without limitation, profile information, content items, communications information, applications, device information, and the like. Some or all of the user's information 503 and Social Device information 502 may be mapped to one or more Ad Hoc SNET groups 520. Some of the user information 503 and device information 502 mapped to an Ad Hoc SNET group can include contact information associated with the user, including, without limitation, one or more telephone numbers, email addresses, webpages, Voice-over IP (VOIP) handles, and the like, and a device's location in a network, configuration/capability information, limits on interaction with a device via the Ad Hoc SNET group, some combination thereof, and the like.

In some embodiments, a user may wish to restrict access by Ad Hoc SNET group members to some or all of the information, devices, and the like mapped to the group 520. For example, while a user may want group members 515 to be able to contact him via his work telephone, the user may not want group members 515 to be able to know his actual work telephone number. In addition, where the work SNET infrastructure is used by a business to enable communication and interaction between its employees, the manager of an Ad Hoc SNET group 520 may not want a member 515 to know the actual contact information, such as work telephone numbers, of any other member 515. This can be addressed by providing partial or complete anonymity to the user, the members, and the like. Such anonymity can be enabled by routing communications between the user, the group members 515, and the like through a proxy element 545, such as a proxy support service. For example, while an Ad Hoc SNET group 520 may collect and store the actual contact information for each of the user and group members 541, the contact information that is provided 543 to members 515 to contact other members 515, the SNET group 520, the user, and the like, may actually be contact information for a proxy element 545, which can redirect a communications attempt to the correct recipient as long as the caller has proper clearance to initiate communications. In this way, no member 515 has the actual contact information of any other member or user in the Ad Hoc SNET group, and, should the user, SNET, or the like choose to remove a member 515 from the group 520, the member 515 will not be able to contact anyone in the group 520 because the member may, as part of being removed from the group 520, lose clearance to have calls routed through the proxy element 545. In addition, members 515 may be provided with a trigger-sensitive password, such as a time-sensitive key that must be used to validate clearance to route calls through the proxy element 545 and, once revoked, cannot be replaced.

The above discussion for use of a proxy element can be utilized for various communications methods across a variety of contact services 555. For example, where a member 515 may wish to contact another member 515 via email, the message may be sent across a communication network 517, such as a wired or wireless communication network, or the like, to a proxy element 545 that may be stored on a work server, on a device, or the like. In addition, where a member 515 may wish to contact another member by standard postage mail, the proxy contact information 543 provided to the member 515 may direct him to mail communications to a proxy mailbox, such as a P.O. Box, which may itself be configured to forward mail to its correct recipient. In telephone communication embodiments, the proxy element 545 can be a proxy call forwarding service, where the call forwarding service knows the true contact information of the intended recipient, but the member 515 making the call must call the call forwarding service and verify clearance to complete the call.

The above proxy service can be used to enable a user to quickly and easily terminate a member 515 from accessing information and device functionality associated with an Ad Hoc SNET group 520. The member 515 can be terminated from Host SNET group 520 by simply retracting the member's 515 authorization to utilize the proxy element. In addition, the proxy element can be used to reduce the burden of handling updates and changes to the information and device functionalities. For example, a user may change his telephone number and email address. Rather than being forced to contact each member 515 of the group 520 to alert them to the change, send out a group-wide message alerting them to same, or the like, the user can simply update his contact information that is mapped to the group 520, and the proxy element 545 will forward all future communications directed at the user to the new contact addresses, all without alerting the members 515 to any changes in the contact information.

Because member access to the information, devices, and the like passes through the group 520, a user can restrict or terminate one or more member's access via that member's status in the group 520. Any hidden contact information can be represented by a unique ID, unique identifier, proxy address, or the like that is delivered to member 515. Thereafter, if such unique identifier is needed, for example, to place a VoIP call using one of the contact services available to member 515, proxy element 545 can participate to hide the identity of a needed but anonymous VoIP handle. This can be done, for example, by having the VoIP call be setup between the proxy element 545 and member 515, and then with proxy element 545 and the intended recipient, such as social device A. By being a middling node, proxy element 545 can continue to hide the social device A's info as well as the VoIP handle associated therewith or with the actual user. Such anonymity may be merely for the convenience of allowing the user to make a single change and have to flow throughout all members and guests. Alternatively or in addition, such anonymity servicing may support a user's cautious approach to access for a given user or user class (i.e., guest). It also allows a user to disable (terminate) access to a given user, user type or the entire membership via 531, 533, 535, without having to change the underlying, actual contact information.

In some embodiments, various members 515 and users of Ad Hoc SNET group 520 can utilize the SNET group to enable media exchanges. For example, a member 515 can push an item of media content onto the SNET group 520, one or more other members 515, or the like. A member can also pull media content items from the SNET group 520, where the items were previously placed in the SNET group by another member 515, the user, the SNET infrastructure 511, or the like. Anonymity services, including, without limitation, a proxy element 545, can enable media content exchanges using SNET group 520 to be anonymous. For example, proxy element 545 can be used to mask the identity of a member 515 who pushes a media content item into SNET group 520, a member 515, or the like. In addition, a proxy element 545 can mask the identity of a member 515 who pulls a media content item from SNET group 520, another member 515, or the like.

In some embodiments, a user can adjust and modify anonymity and proxy settings on an information-by-information, device-by-device, member-by-member, and other bases. For example, a user wishing to make his personal email address visible to certain trusted members 515 can utilize a user support/control system 531, where a contact management service 533 can be used to manage, update, and modify what information is mapped to the Ad Hoc SNET group 520, and he can utilize a Member Profile and Access management service 535 to control who can access what information, and with what levels of anonymity the information can be hidden from members 515.

In some embodiments of the disclosure, a social group contact information can be shared and updated without requiring the affected contacts (e.g., work cohorts, friends, and family members) to be informed, as SNET memberships, phone numbers and email addresses can change frequently. Specifically, an SNET group can include information associated with a variety of mechanisms for establishing contact with another member, member device, or member device service, including, without limitation, telephone numbers, IP or other routing addresses, VoIP/video call handles, twitter handles, other SNET handles, blogs, web page addresses, email addresses, etc. In accordance with this embodiment, contact persistence and validation can be implemented using, without limitation: a common, shared contact database with success tracking; immediate or periodic updating; periodic, immediate, or error-based database inquiry; some combination thereof; or the like. A common, shared contact database with success tracking can include a shared database of contact information which is updated by any device via contact name, contact address, contact history, and the like organized in a table with a "last contact success time/date" sub-table; in effect or in actuality, the database (or database member AI) may comprise an SNET group member. A database with immediate or periodic updating can be updated whenever a contact proves successful, or periodically upon each SNET attachment. In addition, a device can periodically synchronize a locally stored database with an online database (associated with the SNET group), confirm contact information prior to attempting a contact, only seek database confirmation when locally stored contact information fails to establish contact, some combination thereof, or the like.

Furthermore, resolution of an SNET/SNET group member's and member's device contact information may be controlled at a high resolution (across all SNET groups), a middling resolution (applied to a particular SNET group), or at a lower resolution (on a member or member device basis). For example, in a situation where one SNET group member provides a new telephone number to another SNET group member outside of SNET interaction, by merely updating the new number in a local contact database, the change can propagate into the SNET/SNET group and down to other local contact databases maintained by other devices. Alternatively, a member or member device with addressing changes may directly update the SNET/SNET group database. For example, if all telephone calls and emails are routed through a member's SNET group (secure and revocable) or are retrieved from the SNET group (not secure or revocable) by SNET group members, the SNET group member need only update a number, email or handle once and the change will be effective across all SNET group members.

Figure 6:
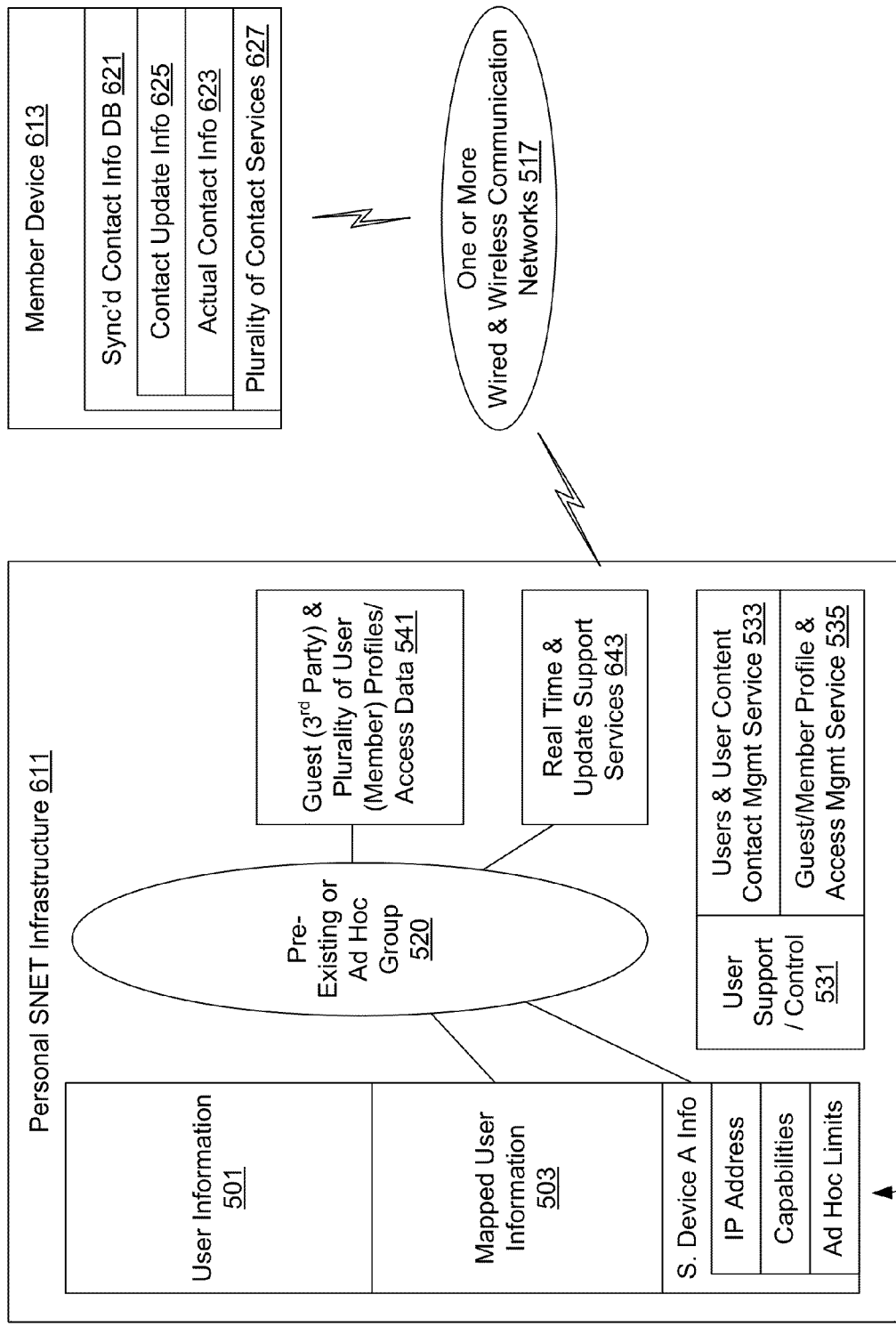
FIG. 6 illustrates Social Networking environments according to various embodiments of the disclosure.

FIG. 6 illustrates an embodiment of a SNET environment supporting access, and management thereof, to information and device functionality via an Ad Hoc SNET group and contact support. As discussed above, a user can utilize a proxy element to both restrict access to contact information and other access and to also update information transparently to the user by mapping, or associating, new or updated information to the Ad Hoc SNET group 520 and instructing a proxy element to route the appropriate communications to the new or updated addresses. In some embodiments, a user may desire to distribute actual information, without use of a proxy element, such as in a personal SNET infrastructure 611 dedicated to family and friends, where anonymity may not be a desired feature of the Ad Hoc SNET group. In such an embodiment, one or more support services, e.g. real time and update support services 643 can enable all members 613 of an Ad Hoc SNET group 520 to maintain up-to-date information, including contact information, device access information, and the like for all members 613. For non-anonymous contact info, member device 613 can have access to currently stored contact information which may be updated on the fly or periodically or as initiated by the member. All contact services, e.g., telephone, email, VoIP, etc., that use such non-anonymous contact info can do so either independently of the SNET infrastructure 611, with infrastructure 611 proxy support, or the like as illustrated and discussed in FIG. 5.

In some embodiments, a member 613 of an Ad Hoc SNET group, which can include a human member, a device member, some combination thereof, or the like, can have access to actual contact information associated with a user who created the Ad Hoc SNET group 520, other members 613, or the like through contact services 627. The contact information can be stored in a database, which can have local copies 621 stored on one or more member devices 613, a central copy located within the SNET infrastructure 611, some combination thereof, or the like. The database 621 can include entries for each member or user of Ad Hoc SNET group 520, and can include all of the actual contact information 623 made available to member 613 from the Ad Hoc SNET group 520, as well as update information 625 associated with each item of contact information, where the update information can indicate how reliable the contact information is by indicating how recently the contact information was used by a member 613 to successfully establish a communication link with the recipient to which the contact information is related. Such update information can be updated locally on a member's device after every successful communication, and updated versions of the contact database 621 can be transmitted to some or all other member devices 613 after every local update, periodically according to a schedule, or the like. In addition, updated local databases 621 can be transmitted to the SNET infrastructure 611, where updates are incorporated into a central contact information database 541. The updated central database can be retransmitted to some or all member devices 613 to replace their individual local databases 621 on a predetermined schedule, upon receiving an update from one or more member devices 613, according to some internal logic or user command, or the like.

In some embodiments, members 613 can access the Ad Hoc SNET group 520, and information mapped to it, via various means. For example, a full SNET member can utilize an SNET application on the member's device 613 to access the Ad Hoc SNET group 520, as well as a browser application, or the like. In addition, a third party member can use a simple browser application, a basic support application, or the like.

In some embodiments, an individual may wish to temporarily join an SNET, SNET group, or the like (possibly anonymously as guest). For example, an individual may wish to gain access to (location-aware) regional information and services, including broadcast advertised SNET groups, browsing and search related SNET groups, advertising SNET groups, hotel SNET groups, airport information and services SNET groups, sporting event SNET groups, etc. The individual may also enable delivery of information such as the individual's current location within a travel itinerary or presence (may perform dynamic twitter tagging), capabilities, or desires.

In accordance with some embodiments of the disclosure, a secure environment can be provided wherein a temporary (e.g., duration set, bandwidth capped, file access restricted, etc.) password and login and/or invitation are generated and securely distributed to a visitor/guest (perhaps even using near-field support). For example, an individual may create an SNET group named "my home for visitors" or "abc hotel" and then invite a guest to the SNET group. Constraints on all devices, personnel, information, hosted media content, etc., can become available, but may time out, diminish, degrade, or the like within a fixed period of time associated with the SNET group or the offer to join (similar to a "basic services set"). Such operations might be performed by a security application that establishes and monitors an encrypted link mechanism through which a guest(s) can safely communicate. Such security application may also support Ad Hoc revocation, restriction, extension and monitoring of any or all outstanding guest bandwidth volumes, usage dates, etc.

In another embodiment, SNET/SNET group creation is performed on the fly, or a short term invitation to such SNET/SNET group is communicated to a (potential) guest member. For example, the guest member may walk down the street and receive an offer to join, as an anonymous guest, a neighborhood sales SNET group established by permanent member local merchants utilizing the group to communicate advertisements. Similarly, restaurants may offer seating availability or reservation information, perhaps in conjunction with discounts during slow periods, via an SNET group.

Other potential embodiments of and applications for ad hoc and/or temporary SNETs can include, without limitation: sporting events; entertainment events/establishments; internet access and advertising at coffee shops, hotels, etc.; personalized application delivery to a communication device; and emergency/witness group notifications following a vehicle accident (may also trigger sensor data gathering and offer common communication pathways). Further embodiments may include, without limitation: GPS-based invitation services (e.g., at a sporting event with human SNET group members at a soccer field, hockey rink, etc.; social cameras taking pictures and video (for example, video from the front row of a concert is consumable by the back row); hand-held social devices/phones; voting and questionnaire prizes; software services providing trivia; meal ordering with a preset number for pickup and payment; social camera feeds providing instant replays, fan research data and media access; proximity-based introductions; flash events; SNET group records/history and storage; some combination thereof; and the like.

Many SNETs groups, including, without limitation, Ad Hoc SNET groups, can be configured to add members, provide accesses, and terminate members based upon one or more trigger events, including, without limitation, the SNET group members' respective locations with respect to a particular environment, elapse of a period of time, some combination thereof, or the like. Current localized networks may provide access to certain functions, such as wireless networks, based upon one's geographic location, such as a host premises, but such networks are very restrictive, and are firewalled against outside access and interaction.

In some embodiments, a scheme for restricting SNET membership contact access and SNET dissolution may be implemented through an anonymous addressing scheme which requires authorized proxy interaction; modification of social devices to require a secure mechanism for conducting contact access, which can involve both known public contact access information and a changing private key; some combination thereof; or the like.

With regards to authorized proxy interaction, SNET tear down or dissolution can comprise retracting, de-authorizing, or the like, the proxy service from a member in a manner applied directly by a member to any other to be restricted member/SNET group device or human member, directly to a proxy member element within a SNET group, inherently when such member terminates inclusion in the SNET group or SNET, some combination thereof, or the like.

With regards to restricting/terminating SNET access via secure mechanisms, a terminated member's private key is not renewed and therefore will not work, even when public contact access in possessed. Such a private key can extend beyond a single key to multiple keys for each member, member device or service to enable an immediate lock-out or restriction of one member without affecting others.

Figure 7:
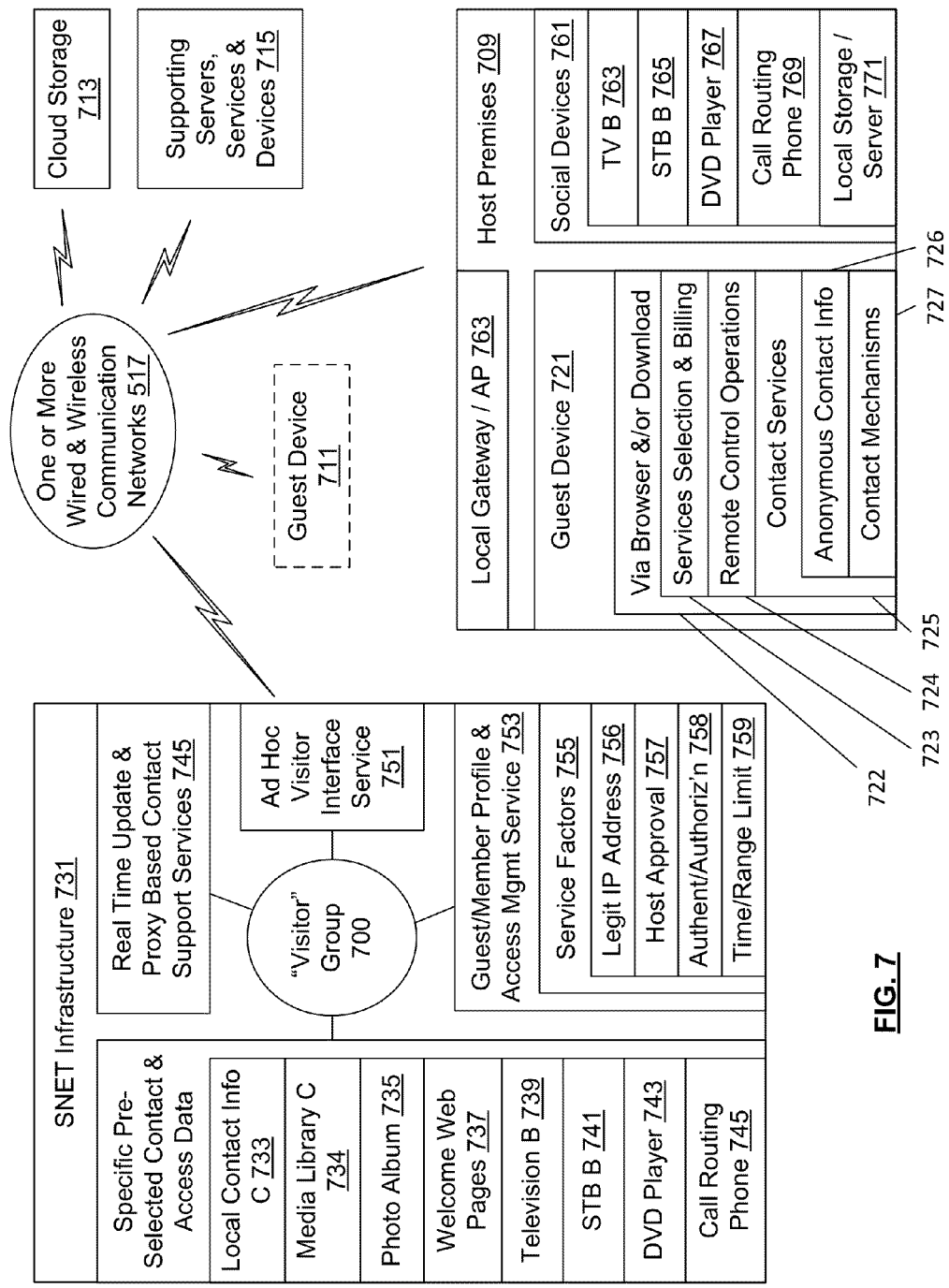
FIG. 7 illustrates Social Networking environments according to various embodiments of the disclosure.

FIG. 7 illustrates an embodiment of a social networking infrastructure enabling control over SNET group membership and access. In some embodiments of the disclosure, a host premises includes a premises network 709, which provides social devices entering the premises network 709 access to certain information, functionality, or the like. Determining that a social device has entered the premises network can be enabled by providing a user of a visiting social device with a password, passkey, or the like to access a local gateway, access point 763, or the like. In addition, the premises network 709 can be sufficiently confined to the host premises that a device that is able to access the access point 763 is considered to be within the host premises and is allowed into the premises network. Devices entering the premise network may be assigned various level of membership in the premises network, based upon various factors. For example, a social device 761 that has been within the premises network 709 before may receive a full membership, as opposed to a first-time visitor device 721, which may receive only a guest membership. Membership levels can determine levels of access to devices and services on the host premises 709. For example, a social device with a full membership 461 can, in some embodiments, have full access to a television 763, set-top box 765, DVD player 767, call routing telephone to enable local calling abilities 769, local storage and server access 771, some combination thereof, or the like. In contrast, a social device with a guest membership 721 can, in some embodiments, have more limited access to premises services and devices, including, network browser and download access 722, services selections and billing operations 723, remote control of some devices 724, contact services 725 for contacting the some anonymous contacts 726, over a proxy element or some other mechanism 727, and the like.

In some embodiments, memberships on premises network can be terminated by a network manager, according to some internal logic, or the like. For example, when a device leaves a premises network, the device's access to devices, information, services, and the like on the host premises may be terminated by terminating or restricting access granted by the membership, retracting authorization to interact with SNET group services or devices via a proxy element, or the like. This can occur automatically, in response to a trigger event, including, without limitation, elapse of a predetermined time after entering or leaving the premises network 709, or the like. Some memberships can maintain residual access after a device leaves the network. For example, where the premises is a hotel, and a device belongs to an exclusive hotel membership, the device may, after leaving the premises network 709, still receive at least some access to functionality or services associated with the network, including, without limitation, a call routing phone service 769.

In some embodiments, a SNET infrastructure 731 can maintain a visitor SNET group 700 dedicated to SNET members and non-members who wish to participate and interact with a certain location, task, event, or the like. For example, an SNET group 700 can be established for a baseball game, a baseball stadium, and the like, such that a visitor to the stadium can join an SNET group 700 dedicated to the game, the stadium, or the like. Such SNET groups can, in some embodiments, be Ad Hoc SNET networks, in that visitors may be invited to the SNET group on the fly as they reach a certain location, perform a certain action, or the like. For example, a restaurant may create an SNET group 700 dedicated to providing information about the restaurant to any SNET members who approach within a certain distance of the restaurant; the SNET infrastructure 731 can transmit an invitation to join the SNET group 700 to a device 711 of any SNET member who crosses a proximity threshold to the restaurant, via a proxy based contact support service 745, device, or the like, which can be located within or without the SNET infrastructure 731. SNET members who choose to accept the invitation, which can include no more than a unique identifier associated with the SNET group 700, can accept via the SNET infrastructure's visitor interface service 751. Third-party non-members can also join the SNET group 700. Upon joining the SNET group 700, each SNET member or non-member can be granted a membership in the SNET group. Each membership can be different and tailored to the member's device, SNET account or lack thereof, some combination thereof, or the like.

In some embodiments, membership in a visitor SNET group 700 can confer certain access privileges to the member. For example, the member can, while the membership is active, access certain contact information 733, one or more libraries of media content items 734, photo albums 735, webpages 737, televisions 739, set-top boxes 741, DVD players 743, Call Routing Phone services 745, some combination thereof, and the like. Access can include the ability to access certain information located on various networks, devices, servers, and the like that are not under the direct control of the SNET group 700. For example, SNET group 700 can enable access to media content items located on other networks, such as a supporting server 715, a cloud computing network 713, or the like, and provide the content items via a proxy element so that the actual location of the content items is masked to the member accessing the content items.

Access to the services and devices made available through SNET group 700 can be managed by an SNET group manager on a collective or individual basis. For example, an SNET group manager can access a member access management service 753, which can enable the manager to adjust server factors 755 related to one or more member's access to various services, limits upon the access, time and range limits 759 on the membership, range of legitimate IP addresses 756 that can be browsed by the member using the SNET group 700 browsing services, host approval 757, and the like. The manager can also terminate membership of one or more members by withdrawing authorization 758 to access the SNET group, a proxy element 745, some combination thereof, or the like. In this manner, the manager can quickly and easily restrict or terminate a member's access to services, devices, and the like dedicated or related to the SNET group 700.

In some embodiments, a member, including a human, a device, or the like, can be added to an SNET group to enable the member to access or receive services, contact information, other information associated with the SNET group, exchange information, some combination thereof, or the like. Such a member can be an existing member of an SNET, a nonmember, also referred to herein as a third party, or the like. For example, a human user with a device can approach within a threshold, such as a proximity, of an access point for a premises, or the like, upon which the access point, some other device associated with the premises, or the like delivers an invitation to an SNET group associated with the premises to the human user via the device, to the device itself, some combination thereof, or the like. The invitation can vary depending upon whether one or both the human user and the device are already members of the SNET, nonmembers, or the like. For example, where the device is not a social device, the access point can deliver an invitation in the form of a web page to the device via a browser application, or the like, that offers the device, human user, some combination thereof, or the like the option of joining an SNET group as an ad hoc member. Where the device is a social device, the invitation can include a direct invitation to the SNET group via a social interface, or the like, located on the device.

The invitation can be accepted via one of various acceptance processes. For example, where a social device receives an invitation that includes a unique identifier uniquely identifying the SNET group to which the social device is invited, the social device can interact with an access point, another device, an SNET via an independent pathway, or the like to utilize the unique identifier to accept the invitation. Acceptance in the above example may include simply delivering the unique identifier and information identifying the social device delivering the unique identifier, upon which the social device is identified as a member of the SNET group. In addition, where a non-social device attempts to access an access point, and the access point pushes a web page to a browser application on the non-social device, the acceptance process can include accessing the web page, indicating a desire to join the SNET group, providing some other information, or the like, such that the non-social device is accepted as a member of the SNET group.

Upon accepting the invitation, the human user, device, some combination thereof, or the like can gain at least some access to services, information, or the like provided for the premises. For example, where the premises is a coffee shop, a member of a premises-based SNET group may gain access to various services including, without limitation, online newspapers, videos, a menu for item sales, shopping options for home delivery, ordering interface for on-site delivery, other information, some combination thereof, or the like. In another example, where the premises is a hotel, private residence, or the like, a member of a premises-based SNET group may gain access to services, information, and the like including, without limitation, access to locally or remotely-stored content items, contact information, access to control functional elements of on-site devices, some combination thereof, or the like. In another example, where the premises is a shopping mall, an access point may deliver, push, or the like an invitation to the device, user of the device, some combination thereof, or the like to join an SNET group associated with the mall. The access point may require that a device, user, or the like attempt to access the access point before the invitation is delivered to the device, user, or the like in the form of a unique identifier, web page, or the like. Services associated with the SNET group can include, without limitation, advertising, sales and coupon information, and the like provided by computing devices of each store within the mall, a mall mapping service that shows SNET group members the locations of particular stores, a mall music service that provides SNET group members with music or other media content served by media sources associated with the SNET group, telephone directory services, a search engine relating to anything within any store in the mall, some combination thereof, or the like.

In some embodiments, an access point supports delivery of invitations to join an SNET group, processing acceptances of invitations, routing communications between members, ad hoc members, and potential members of an SNET group and the SNET, SNET group, or the like. A device may need to attempt to access the access point to receive an invitation provided by the access point. In some embodiments, the access point automatically provides the invitation to any device that the access point determines has crossed a threshold, such as a predetermined proximity to a premises, location, or the like. Members of the SNET group, including ad hoc members, may be able to couple with other devices, users, members, or the like that are also SNET group members, ad hoc members, or the like. Upon crossing another or the same threshold, an SNET group membership can be terminated or restricted. For example, where a device that enters a premises is offered an ad hoc membership in an SNET group by an access point, the access point may restrict, terminate, or the like the ad hoc membership upon determining that the device has left the premises.

Figure 8:
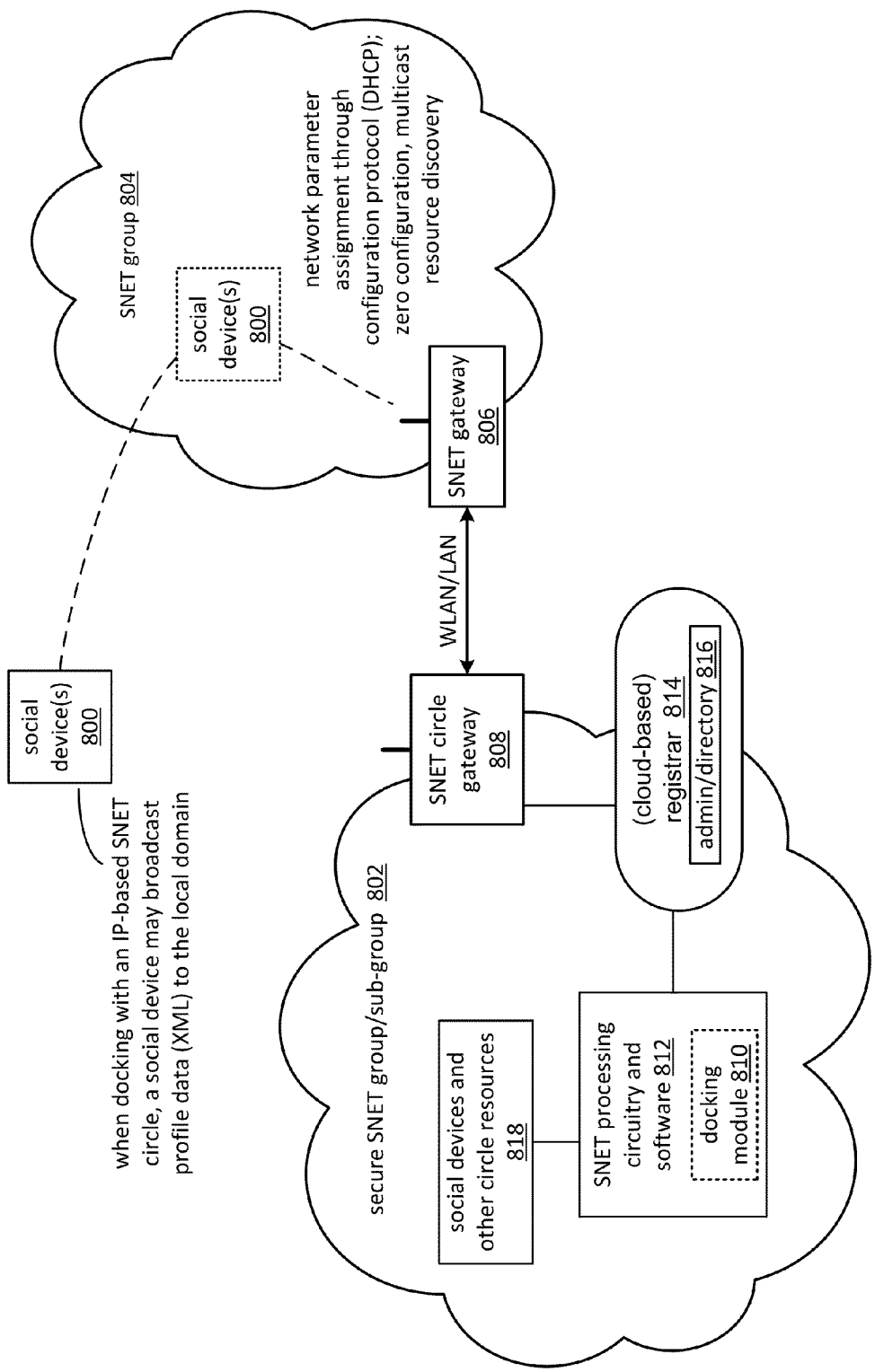
FIG. 8 illustrates a schematic block diagram of an embodiment of social device docking with a social network group/sub-group according to various embodiments of the disclosure.

FIG. 8 is a schematic block diagram of social device docking with a social network group/sub-group in accordance with the present disclosure. In the illustrated embodiment, a social device 800 may indicate a desire to associate, dock, or otherwise communicate with a (secure) SNET group/sub-group 802. The social device 800 device can be autonomous and independent or, alternatively, a participant in a second SNET group 804 or other network serviced by the SNET gateway 806.

In one embodiment, either the SNET gateway 806 or SNET group gateway 808 functions as a proxy for the social device 800. Proxy functionality within the SNET gateway 806 may be provided by a software application or a computer system (server) that functions as an intermediary for requests from clients (including connected social devices) seeking resources from other servers or gateways such as SNET gateway 808. Such resources might include files, services, web pages, connections, profiling information, and interaction with social devices and other available SNET group resources 818.

The SNET gateway 806 may evaluate requests from social devices according to various filtering rules. For example, the SNET gateway 806 can filter traffic by IP address or protocol. Once a request from the social device 800 validated (if necessary), the SNET gateway 806 connects to the SNET group gateway 808 over a WLAN/LAN or other communication path and requests access to resources of the SNET group/sub-group 802 on behalf of the social device 800. The SNET gateway 806 may optionally alter the request from the social device 800 or the response from SNET group gateway 808 as appropriate.

Membership in the SNET group/sub-group 802 can be established through a docking module 810 of the SNET processing circuitry and software 812, which may support one or more device discovery and configuration protocols. When SNET group membership is restricted, a local or cloud-based registrar 814 can be employed to provide authentication. The registrar 814 of the illustrated embodiment may utilize an administrator, or a directory service 816 such as a Lightweight Directory Access Protocol (LDAP)-based directory server that stores attribute data. LDAP is a well-known application protocol for querying and modifying items in directory service. When docking with an IP-based SNET group, a social device may broadcast profile data to the local domain using a textual data format such as Extensible Markup Language (XML).

Figure 9:
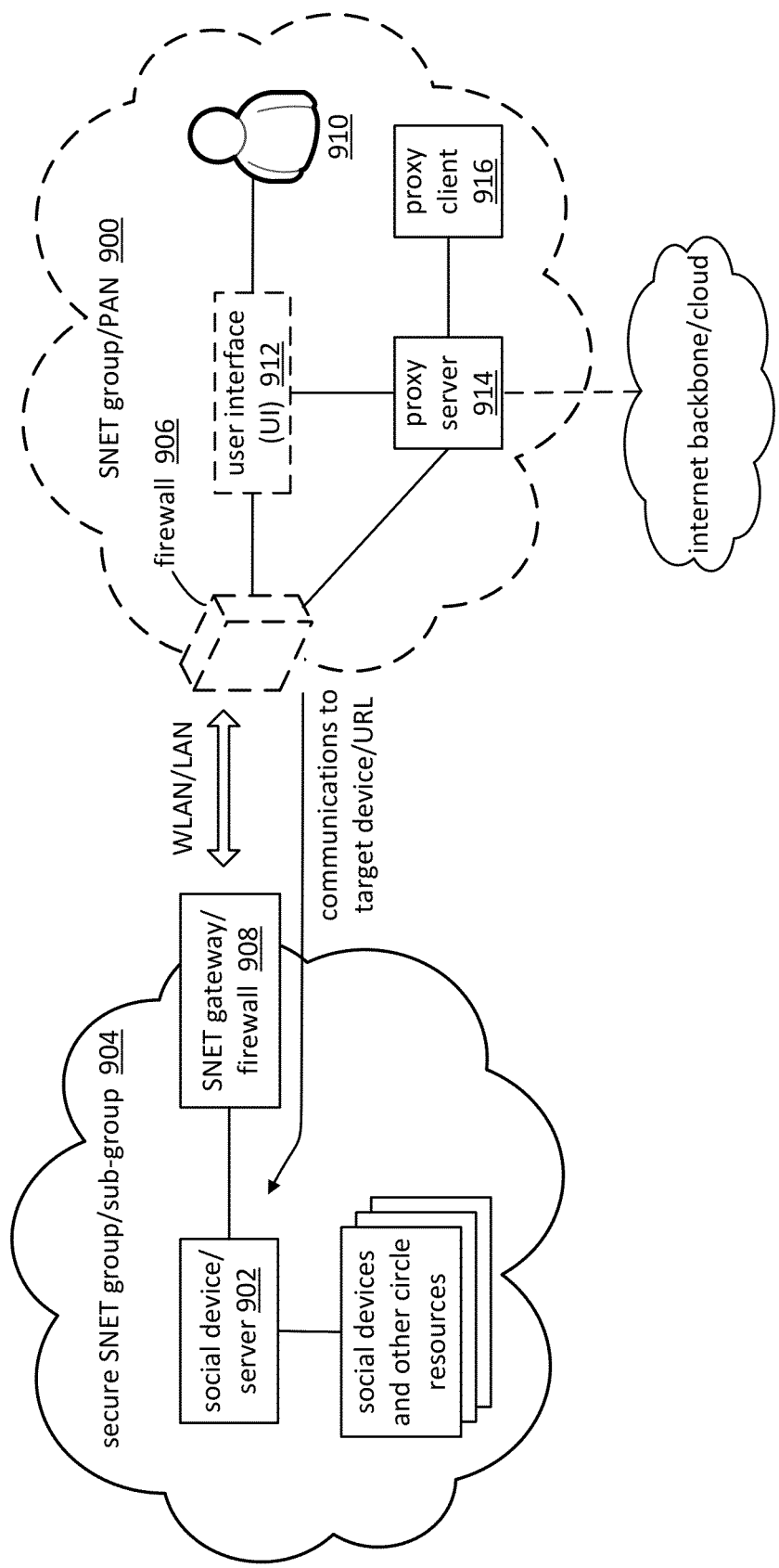
FIG. 9 illustrates a schematic block diagram illustrating access to a social device participating in a social network circle/sub-circle according to various embodiments of the disclosure.

FIG. 9 is a schematic block diagram illustrating access to a social device participating in an SNET group/sub-group in accordance with an embodiment of the present disclosure. More particularly, a member or resource within a SNET group/PAN 900 accesses a social device/server 902 (or group resources such as an Internet-based resource identified by a URL reference) associated with a second, secure SNET group 904.

Membership in the SNET group/PAN 900 might include, for example, a human member 910 accessing the SNET group 904 via a user interface (UI) 912. In various embodiments of the disclosure described herein, a UI 912 may comprise a graphical user interface (GUI), voice controls, gesture commands, etc. The UI 912 may take the form, for example, of a browser that graphically indicates available resources. Access to the SNET group 904 can also be provided by a proxy element, which can include, without limitation, one or more proxy servers 914. The proxy server 914 can function as an intermediary for access requests from proxy clients 916—including social devices connected to the proxy server 914 via the Internet or other IP-based networks—seeking to communicate with the SNET group/sub-group 904. Such resources might include files, services, web pages, connections, profiling information, and other available SNET group resources. It is noted that the human member 910 and proxy server 914 may operate independently of a SNET group or PAN. Further, the proxy server 914 may be a distributed or cloud-based entity, or a member of (or incorporated in a member of) the SNET group/sub-group 904.

In the illustrated embodiment, communications with the SNET group/sub-group 904 flow between a firewall 906 and/or a SNET gateway/firewall 908 over a WLAN/LAN communication channel. The firewall(s) may be software based (e.g., as part of an operating system), or comprise various combinations of software and/or hardware components. In addition, a firewall may be incorporated in a gateway/router such as the SNET gateway/firewall 908. In certain embodiments, the firewall may be operable to perform basic routing functions.

SNET group resources may be accessible via a zero configuration, multicast discovery protocol that locates devices, such as printers, and the services offered by those devices on a local network using a multicast discovery protocol and related service records or profiling information. Such a protocol may operate at the application layer. Wide area service discovery of SNET group resources configured in this manner may be enabled through an appropriately configured domain name service (DNS) server. Further, SNET group resources may be configured to support interoperability guidelines and network protocols, such as Universal Plug and Play (UPnP), that provide uniform mechanisms and restrictions for accessing resources and media over a network.

SNET group communications according to various embodiments of the disclosure may utilize a variety of transmission protocols. By way of example, most communication over the Internet is currently performed in accordance with the Transmission Control Protocol (TCP) and User Datagram Protocol (UDP). As is known, TCP typically provides an intermediate level of communication services between, for example, an application program and the Internet Protocol (IP). Port numbers are used to identify end-points for sending and receiving applications on a host (often referred to as "Internet sockets" or "network sockets"). Internet sockets facilitate delivery of incoming data packets to an appropriate application process or thread, as determined by a combination of local and remote (e.g., SNET group) IP addresses and port numbers. In some embodiments, the Real-time Transport Protocol (RTP) running over UDP may be employed for media streaming applications, real-time multiplayer gaming, voice over IP (VoIP), and like applications that are tolerant of a certain level of packet loss and may not require a dedicated end-to-end-connection.

Figure 10:
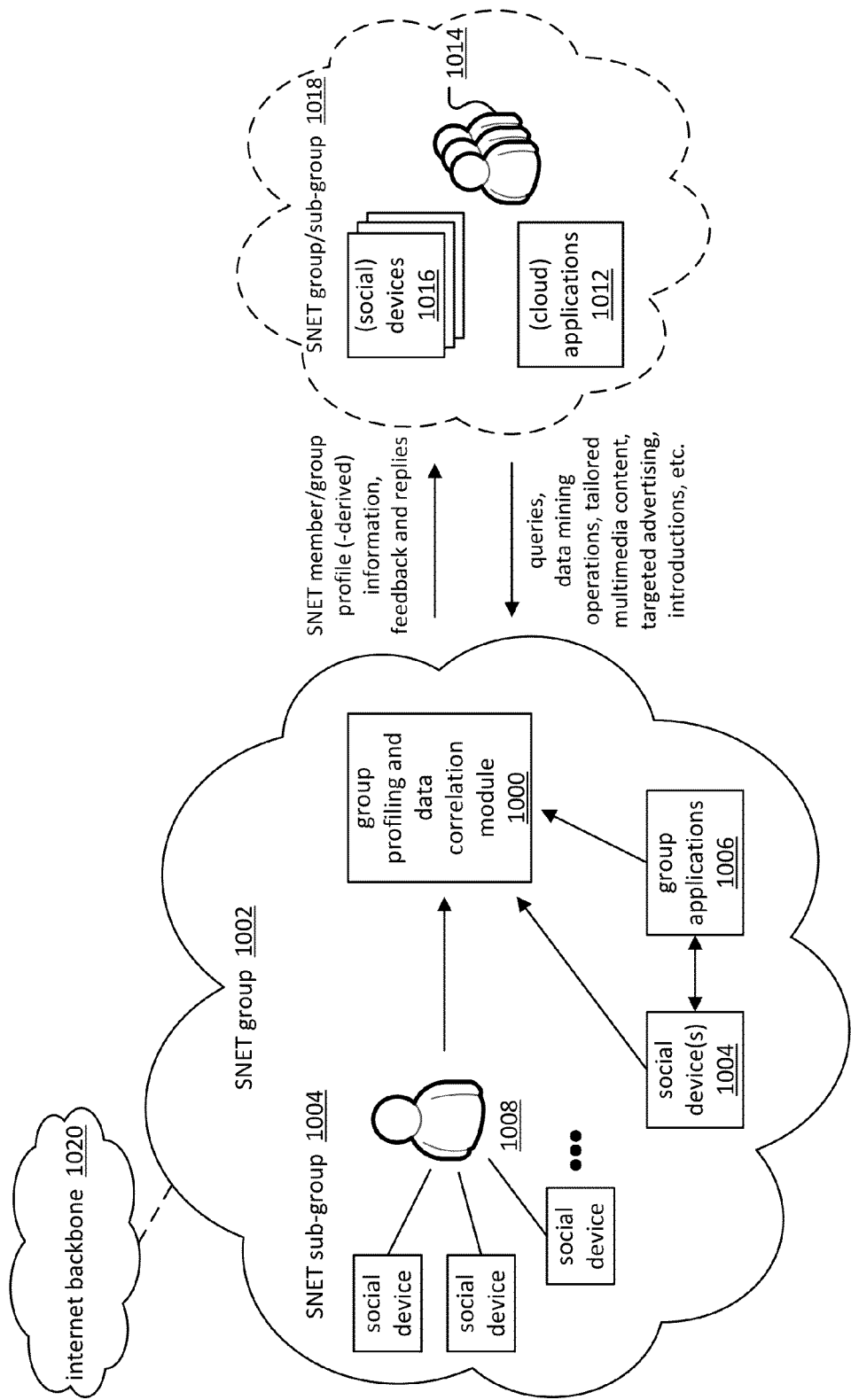
FIG. 10 illustrates a schematic block diagram of an embodiment of social device-based profiling supporting advertising and group offerings according to various embodiments of the disclosure.

FIG. 10 is a schematic block diagram of an embodiment of social device-based profiling to support advertising and group offerings in accordance with the present disclosure. More particularly, a group profiling and data correlation module 1000 operates within a SNET group 1002 (or an affiliated network accessible via Internet backbone 1020) to compile profile and profile-related data regarding group members. In the illustrated embodiment, members of the SNET group 1002 include social devices 1004 associated with member 1008, group applications 1006, and a SNET sub-group 1004 comprised of a human member 1006 and affiliated social devices.

Data compiled by the group profiling and data correlation module 1000 may be used by members of the SNET group 1002 to perform a variety of operations. The data may further be accessed by a separate or intersecting SNET group/sub-group 1018. Membership in the SNET group/sub-group 1018 includes, for example, cloud-based applications 1012, human members 1014 (via an API), and a variety of social devices 1016. In an alternate embodiment, such entities operate independently of a SNET group/sub-group.

Figure 11:
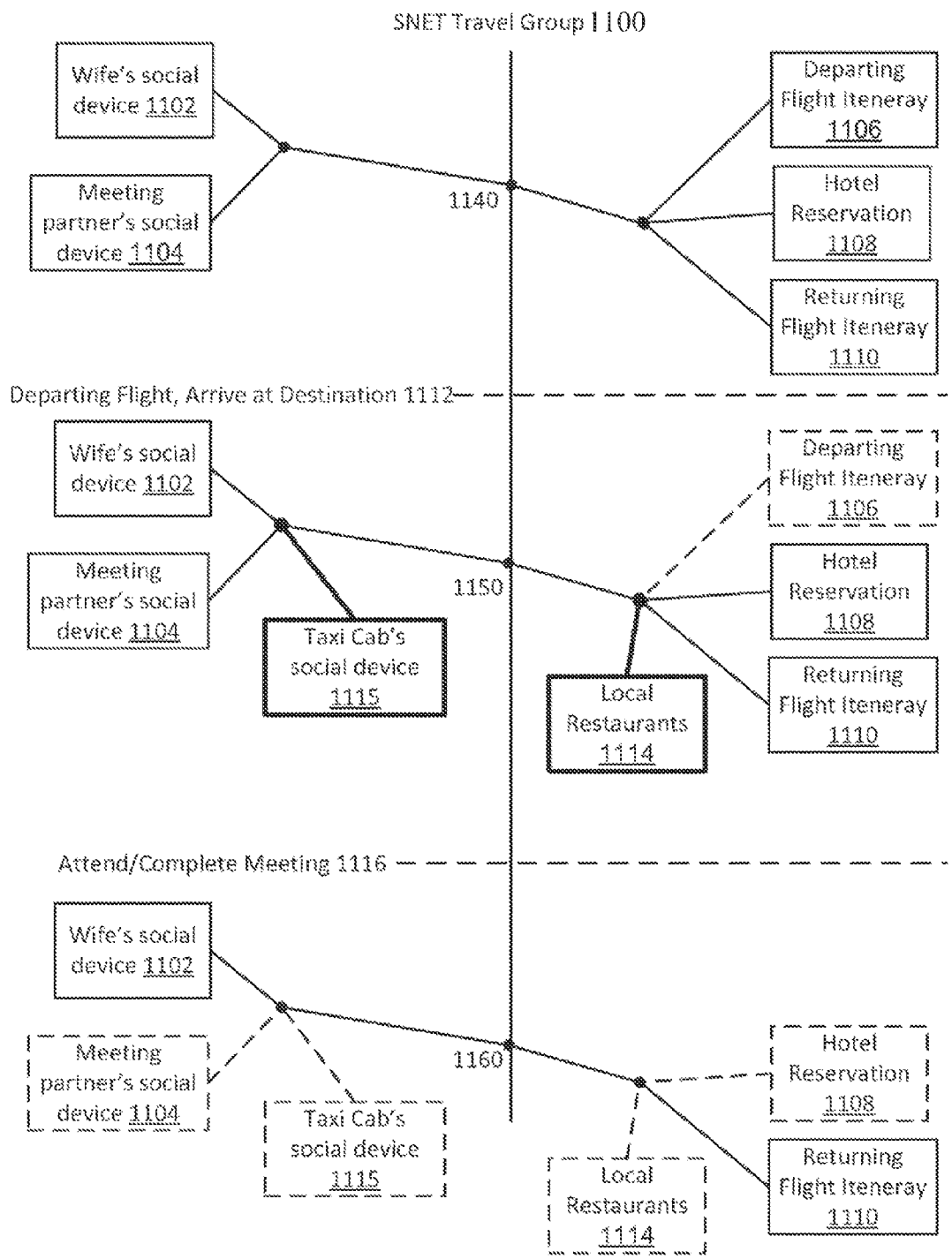
FIG. 11 illustrates a sequence diagram depicting travel social networking according to various embodiments of the disclosure.

FIG. 11 illustrates an embodiment of a social networking environment that adapts to trigger events, triggers, or the like. Some embodiments of SNET groups can respond to externally-applied or internally-applied trigger events, such as completions of certain events, changes in location, elapses of time, some combination thereof, and the like. The illustrated embodiment, shown in FIG. 11, is an SNET group that is designed to be used during travel, such that the SNET travel group 1100 responds to completions of certain travel events, changes in location, and upcoming events by adding, removing, or otherwise modifying the information, access, and members of the SNET group. The illustrated embodiment also illustrates the changes that the SNET travel group undergoes as a trip progresses. The illustrated embodiment shows a SNET travel group for a short business trip that involves departing and return flights, a stay in a hotel at the destination, and a meeting with some various partners at the destination.

As shown in state 1140, at the beginning of the trip, the SNET travel group 1100 includes two members, a social device 1102 associated with the traveler's wife and a social device 1104 associated with the individuals with whom the traveler is to meet at the destination. In some embodiments, members of the SNET group can include an SNET account dedicated to the SNET members, such that any social device associated with the member is a part of the SNET travel group 1100. In addition to the members 1102 and 1104, the SNET travel group at state 1140 includes the traveler's flight itineraries 1106 and 1110 for his departure and return flights, as well as information 1108 related to his hotel reservation. All of the above memberships and information can be added to the SNET travel group manually by the traveler or some other entity, by a travel agency or device, or some other internal logic of a social device, SNET, or the like.

As shown by line 1112, after the traveler completes his departure flight and arrives at his destination, his SNET travel group 1100 adapts to state 1150. As the departure flight is completed, the SNET travel group 1100 removes the departure flight itinerary 1106 from the information associated with the group 1100, as that event has been completed. In addition, in response to the change in location, SNET travel group 1100 can seek out and add information related to local restaurants 1114 at the destination, and add one or more potential taxi cabs' social devices 1115 to the group 1100 in accommodation, anticipation, or the like of the traveler's likely needs.

As shown by line 1116, upon completion of the traveler's meeting and his preparation for his return flight, SNET travel group 1100 has adapted to state 1160, in response to the completion of his meeting and his checking out of his hotel. As the traveler is about to depart his destination, the local restaurant information 1114 and the taxi cab social devices 1115 are removed from the SNET travel group 1100, while the hotel reservation information 1108 is removed in response to the traveler checking out. Also, the meeting partners' devices 1104 are removed from the SNET travel group 1100, as the meeting is complete, and they no longer have interest in the traveler's trip. The only remaining items in SNET travel group 1100 are the traveler's upcoming return flight itinerary 1110 and the social device 1102 associated with the traveler's wife.

In some embodiments, as a traveler's trip progresses, adding and removing certain information, members, and accesses from the SNET travel group 1100 enables the traveler to interact with information and SNET members that are most relevant to the current and upcoming likely trip events, such as reaching a new destination, preparing for an event, finding landmarks, restaurants, lodging, and the like.

In some embodiments, an SNET group, including an SNET travel group, is not created by a user, manager, or the like, but rather is set up as part of the SNET infrastructure 731. Such SNET groups 700 may or may not be Ad Hoc SNET groups, and may be joined and exited at any time. For example, an SNET group may be dedicated to photographs taken at a certain location by socially-aware devices. SNET members in the area can join the SNET group and push relevant media content items to the SNET group, where they may remain indefinitely, until a certain trigger event is reached, such as elapse of time or departure of the SNET member from the area, or the like. A traveler may add content items, for example, acquired during a trip to his SNET travel group 1100 so that other members of his travel group can view the content items.

In some embodiments, an SNET group member can utilize an SNET group, including, without limitation, a SNET travel group 1100, to engage in gaming and gambling actions. For example, a traveler entering a casino, arcade, or the like may add a gambling credit account to his SNET travel group and utilize the account to interact with and play various gambling and gaming activities. In some other embodiments, an SNET member can establish a game over a network by adding a social gaming device to an SNET group. Also, SNET members can be, in some embodiments, added to one or more SNET groups dedicating to gaming activities based upon certain information associated with the SNET member, such as device connection speed, device capabilities, gaming score, or the like.

As described above, some embodiments according to the disclosure comprise a wide variety of social devices, device services, proxies, and software applications of various types participating as SNET/SNET group members. Further, social devices and other types of SNET/SNET group members having related or specific characteristics and interdependencies can form SNET/SNET groups having specific purposes such as those described below in conjunction with FIG. 12. Various embodiments can comprise, for example, SNET/SNET group members such as device manufacturers, automobile owners, hospitals and medical providers, repair shops, insurance companies and other third parties that might have an interest in communicating with a human member and/or associated SNET devices. Such SNETs/SNET groups/SNET subgroups can be stand-alone or an extension of other SNETs/SNET groups/SNET subgroups.

Some embodiments of an SNET/SNET group/SNET subgroup according to the disclosure comprise various security devices and related services. Such SNETs can include, for example, child monitoring groups, neighborhood watch groups, police/fire and security company groups, etc. A police or security company can, in some embodiments, participate in an SNET in order to monitor a series of crime alert situations via a neighborhood group of participants and systems. Other actions/functionality can include, without limitation: alert generation due to social docked alarm systems (e.g., a neighboring security device activation might trigger an alert within nearby homes, possibly allowing neighbors to identify thieves, etc., and activate exterior lighting of a contiguous group of neighboring homes); activation of security cameras with recording capabilities; some combination thereof; and the like. Likewise, police can, in some embodiments, use the SNET to gain access to, and participate in, an area-wide mapping. This way, hot spots of criminal activity could be identified and quickly serviced using social network "civilians" and their communication devices (turn on recording of sensor devices) in and around regions, as well as logging individual identities for possible interviews for evidence.

In some embodiments, social (family) communication devices indicate when a residence is likely unoccupied. When this occurs, motion detection within the residence can indicate an intrusion. A social camera device could then be activated to begin capture, storage and delivery of information relating to motion, via the social network, to family communication devices. Family members can then make a judgment call regarding such information, and if desired trigger (via docked social devices) police or security team's involvement.

Social security/safety devices, in some embodiments, can include, without limitation: smoke, CO2 and radon detectors, some combination thereof, and the like. For example, a social smoke detector can deliver an alarm not only in a traditional way, but also via some or all docked social devices within a safety SNET/SNET group. Via such a SNET group, other social devices within a home might begin to alarm. Some such devices might even communicate to a neighbor, friend or relative, fire station and/or other monitoring personnel. In some embodiments, other social device members might be utilized via a SNET group. For example, dedicated social cameras within a home can be activated and begin capturing, storing and forwarding video. Face recognition can be employed in an effort to identify intruders. Fire or police can view forwarded video to assess the need to dispatch and/or contact a home owner (using use social devices in a subject SNET) for voice/video communications. Smoke data can also be delivered along with smoke detector metadata, such as GPS data ("living room" on the northeast corner of the house on the first floor), home address, owner, contact info, etc., which can all be part of the social safety SNET group. Note that social smoke detectors can have an integrated camera and fireproof storage for later deciphering of the cause of a fire.

Figure 12:
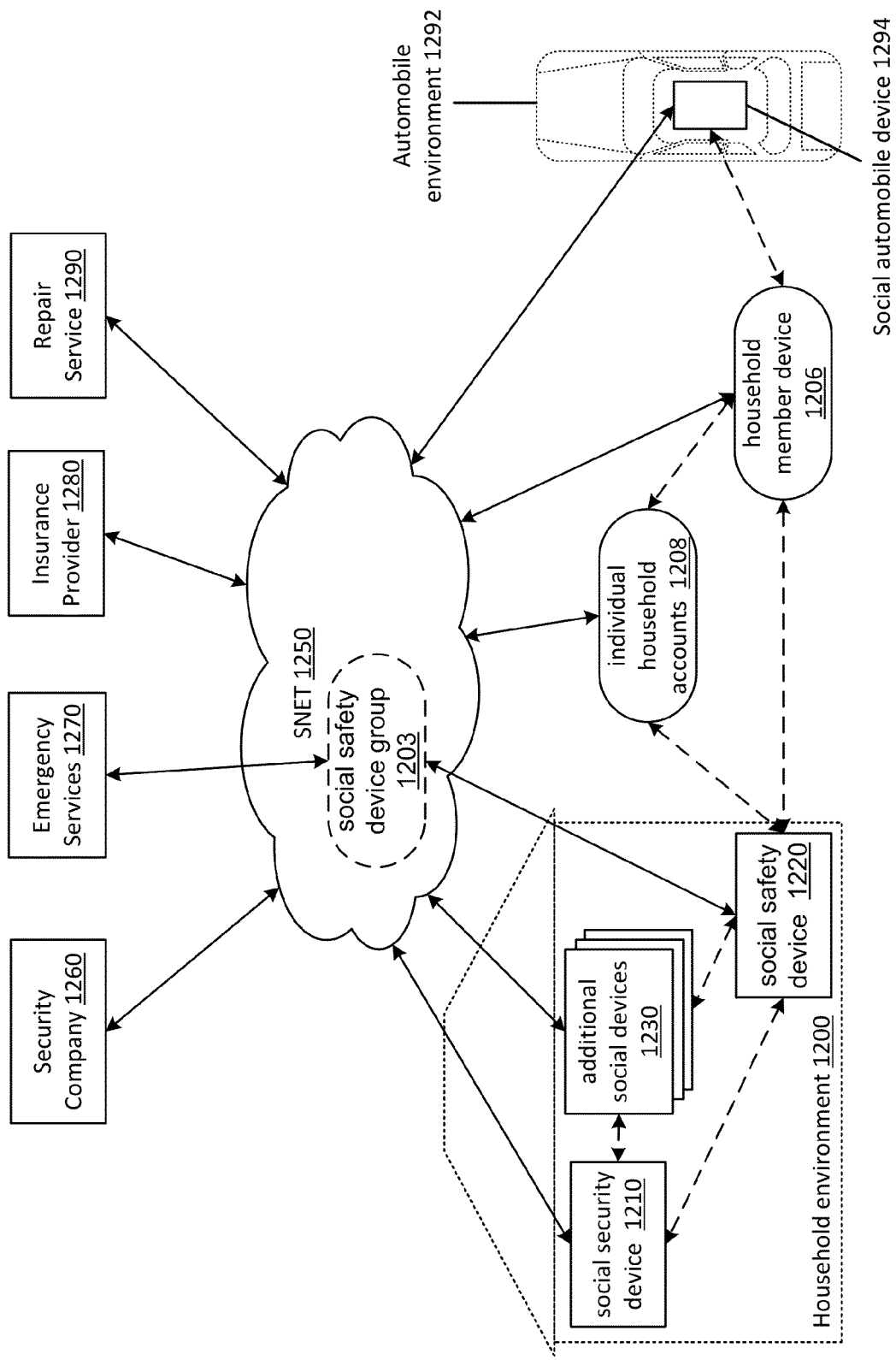
FIG. 12 illustrates a social device social networking environment according to various embodiments of the disclosure.

FIG. 12 illustrates an embodiment of interaction between various social devices and one or more social networks. In some embodiments, social devices can be located in a certain environment, including without limitation, a household environment 1200, an automobile environment 1292, an office environment, an industrial environment, some combination thereof, or the like. Social devices located in an environment can be functional devices that interact with social networks, other devices, and the like. For example, a household environment 1200 can include one or more devices that are socially-aware, including, without limitation, one or more social safety devices 1220, one or more social security devices 1210, one or more additional social devices 1230, and the like. A social safety device can be a smoke detector, a fire alarm, a carbon monoxide detector, a sprinkler, a radon detector, a geiger counter, some combination thereof, or the like. A social security device 1210 can include, without limitation, a motion detector, a lock, a security system, a closed-circuit television (CCTV) camera, some combination thereof, or the like. An additional social device can include, without limitation, a thermometer, a thermostat control, a lawn-sprinkler system, a humidity detector, a rainfall meter, or the like. Such devices, in addition to performing their individual functions, can interact with one or more social networks or social network groups, other devices within or without the household environment 1200, one or more members of a social network or outside any social network, some combination thereof, or the like. A social device can interact with an SNET 1250, which may or may not be dedicated to social devices, by becoming a member of the SNET 1250, a particular SNET group 1203 dedicated to similar types of devices, some combination thereof, and the like. Which SNET 1250 or SNET group 1203 the social device interacts with can be determined by user input, internal logic, or the like. For example, a social smoke detector may be hard-wired to, upon being connected to a network, seek out and join one or more selected SNETs 1250, SNET groups 1203, or the like. Social devices may be configured to interact with one or more SNETs 1250, SNET groups 1203, or the like via a wireless network, wired network, cellular network, some combination thereof, or the like. Such connections may adapt to changing local conditions. For example, a social smoke detector can utilize a wireless network to interact with a social safety device group 1203 as long as the smoke detector receives power from the house, but may switch to a lower-power connections, such as over a cellular network, in the event that main power is lost or otherwise degraded below a certain threshold.

Participants in SNET 1250 can include entities with specific interest in the functions of the social devices 1210, 1220, 1230, 1294, and the like. For example, SNET 1250 can include one or more of a security company 1260, an emergency services provider 1270, an insurance provider 1280, a repair service 1290, an account of SNET members associated with one or more of the household environment 1200 automobile environment 1292, or the like, individual social devices 1206 that may or may not be associated with an SNET member account, some combination thereof, and the like. When a social device sends a notification to SNET 1250, SNET group 1203, or the like, additional notifications can be sent to one or more members of the SNET 1250 or SNET 1203, respectively. For example, where a social security device 1210 detects an intruder, in addition to triggering an alarm, the social security device 1210 can transmit a warning signal to SNET 1250, alerting some or all members of SNET 1250 that the social security device has triggered an alarm. The warning signal can be directed to any member of SNET 1250, some members, or the like, such as any devices 1206 or accounts 1208 associated with members of the household environment 1200, one or more security companies 1260, emergency services 1270, and the like.

Where social safety device 1220 is a smoke detector which detects smoke, it may send a warning signal to an SNET 1250, or an SNET group 1203 which may or may not be dedicated to smoke detectors, social devices in the particular household environment, or the like. The warning signal can be received by members of the SNET 1250 or SNET group, including, without limitation, emergency services, insurance providers, repair services, devices 1206 or accounts 1208 associated with members of the household environment 1200, and the like. In addition, participants in SNET 1250, SNET group 1203, and the like can, in some embodiments, interact with social devise in household environment 1200, even if not presently within the environment. For example, where a social security device 1210 such as a security device activates, a security company 1260 that receives a warning signal from the social security device 1210 via SNET 1250 may command the social security 1210 to activate a local CCTV camera in the household environment 1200, activate some other social device 1230, or may activate the additional social device itself. In addition, when a social safety device 1220, such as a smoke alarm, is triggered, a member of the household environment 1200, upon receiving a warning signal from the social safety device 1220 via SNET group 1203 at device 1206, may command additional social devices 1230 that may contribute to a fire to shut down, including, without limitation, a home gas line. To this end, certain devices may be grouped in SNET groups to help facilitate actions involving multiple devices simultaneously. For example, in the above scenario, where all socially-aware devices 1230 that may contribute to a fire, such as cooking appliances, a gas line, a gas heater, or the like, may be grouped together in an SNET group, such that, upon receiving a certain warning, a household environment member can send a command to all of the devices in the group in one action, such as a command to shut down.

In some embodiments according to the disclosure, an insurance provider 1280, repair service 1290, or the like participates in an SNET 1250 in order to view and verify driving behavior histories/data and possibly offer discounts relating to same. The company can, for example, interact with one or more automobile social devices 1294 located in one or more automobiles, automobile environments 1292, or the like. In the event of a certain event concerning the automobile environment 1292, social automobile device 1294, or the like, a message can be sent, directly or via SNET 1250, to certain members of SNET 1250. For example, if the automobile environment 1292 is involved in an accident, social automobile device 1294 can transmit a message to SNET 1250 that can be distributed to emergency services 1270, an insurance provider 1280, a repair service 1290, one or more individual household accounts 1208 or devices 1206 associated with the automobile environment on SNET 1250, some combination thereof, or the like.

In some embodiments according to the disclosure, a SNET "travel" group is provided to facilitate and/or monitor travel activities. The SNET travel group can comprise, for example, travel companions, family members, friends and people to be visited, restaurants; coupon/rebate services; etc. A member of a SNET travel group (which can be temporary or persistent) can receive, without limitation, detailed hotel information (including confirmations, rates, feedback, amenities, restaurant recommendations, nearby attractions, etc.), an attendee list for a social event/excursion, babysitter monitoring services, some combination thereof, and the like.

In some embodiments according to the disclosure, a member of an SNET can desire to share images or other social media with family, photographers, friends, artists, etc. For example, a member may be dining at a restaurant in Athens and capture photos or video via a social camera docked within a social sharing network. Such a sharing network can include SNET groups and sub-groups, such as a group being Travel, a sub-group for Europe; a sub-sub-group for Greece; a sub-sub-sub-group for Athens; and a sub-sub-sub-sub-group for restaurants. By joining such a restaurant sub-group, a member can gain access to restaurant reviews and information and/or consume previously captured media and offer up the member's like contributions to others.

In some embodiments, a social picture/video frame can be an outlet for displaying social content such as video. The relevant SNET can extend beyond the actual dedicated frame to software supporting display of social content on a television, computing device, or any other social device (including social communication devices). SNET operation in accordance with such embodiments can further be associated with a map/location, such that a group of photos from various social cameras within or beyond a SNET group might be queued up for display, along with metadata supporting future or current travel (e.g., GPS location, map routing, etc.). For example, a member's social picture frame might have a map view from which SNET participants can enter a center point, SNET group, country or region. Thereafter, the SNET can provide relevant feeds, which can periodically change. Media feeds can be my own, my family, or world-wide submissions. Such images might also be pictures of people so as to offer up an introduction infrastructure. For example, a member may see someone interesting on the feed and press the frame screen to obtain further information and perhaps request an introduction.

In some embodiments, an SNET is established to support gaming/gambling activities. For example, an SNET can comprise either a persistent SNET or an ad hoc SNET group, and provide for purchase or transfer of gaming "credits" including, without limitation, NFC support for credit purchasing. Further, an online game itself can be established and set up using social devices, etc.

In accordance with the disclosure, various techniques (such as techniques described elsewhere herein) can be employed to determine the existence and location of SNET/ SNET group members and their associated social devices. Such location information can be utilized in a variety of ways including, but not limited to, those described below. For example, SNET location services could utilize one or more of the following standards: GPS, LTE eNB, (IP) address, NFC (Near Field Communication), Bluetooth, WiFi, infrared, etc., and, of course, account metadata. Cloud-based storage can be utilized for various information, including location (e.g., GPS), to extend social network functionalities (for example, automatic SNET grouping/introductions, automatic servicing/selection of peripheral devices, etc.). Location-based groups might also be formed for travel, tracking, invites (and timeouts), etc. Location data, as well as other factors, can also be used, in some embodiments, to select online gaming competition/teams. For example, IP address selection can be conducted in a DNS-like manner for a relevant domain name. In operation, a SNET/SNET group of game players or the like can be formed based on location factors, SNET/SNET group attributes, network attributes, some combination thereof, or the like.

Various embodiments of a SNET group according to the disclosure can comprise a wide variety of social devices, device services, proxies, and software applications of various types participating as SNET group members. Further, social devices and other types of SNET group members having related or specific characteristics and interdependencies may form SNET groups having specific purposes. Various embodiments may comprise, for example, SNET/group members such as device manufacturers, automobile owners, hospitals and medical providers, repair shops, insurance companies and other third parties that might have an interest in communicating with a human member and/or associated SNET devices. Such SNETs/groups may be stand-alone or an extension of other SNETs/groups.

Some embodiments of an SNET group according to the disclosure may comprise a wide variety of social devices, device services, proxies, and software applications of various types participating as SNET group members. Further, social devices and other types of SNET group members having related or specific characteristics and interdependencies may form SNET groups having specific purposes. Various embodiments may comprise, for example, SNET/group members such as device manufacturers, automobile owners, hospitals and medical providers, repair shops, insurance companies and other third parties that might have an interest in communicating with a human member and/or associated SNET devices. Such SNETs/groups may be stand-alone or an extension of other SNETs/groups.

Figure 13:
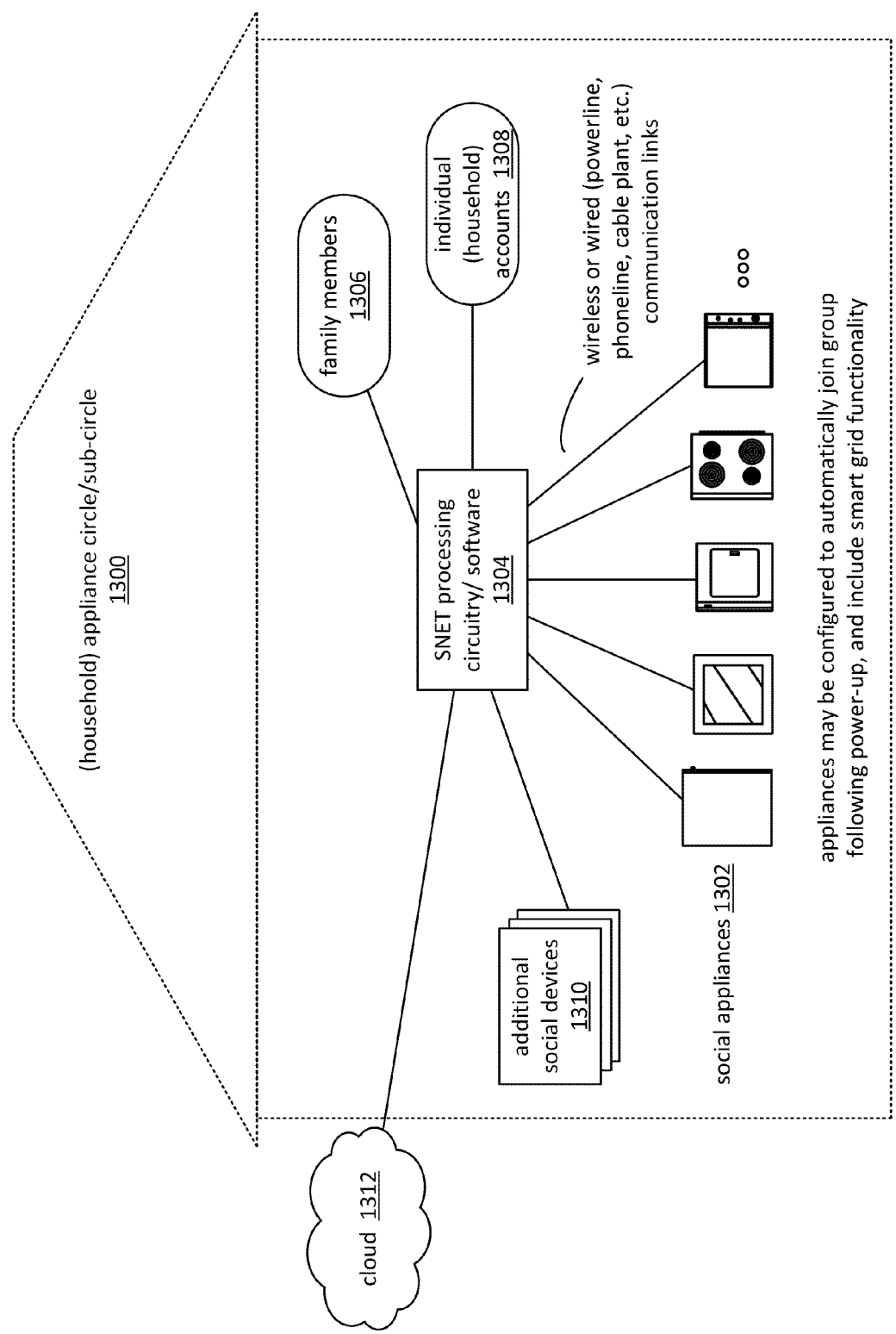
FIG. 13 illustrates an appliance social network group/sub-group according to various embodiments of the disclosure.

FIG. 13 illustrates an embodiment of an appliance social network group/sub-group in accordance with the disclosure. In this embodiment, an appliance group/sub-group 1300 comprises a wide variety of (household) appliances/electronics ("social appliances" 1302) that may include, without limitation, washing machines, dryers, refrigerators, televisions, STBs, thermostats, networking equipment, etc. Membership in the appliance group/sub-group 1300 allows for a variety of interactions with or between such social appliances 1302, including setup and configuration (as generally described above), testing, registration, firmware and driver updates, sharing, status updates including power consumption information, power company integration, location information sharing, formation of sub-groups of social appliances, permissions management, etc.

Such interaction, including communications with various social devices 1310 and family members 1306 participating in the appliance group/sub-group 1300, are facilitated through SNET processing circuitry/software 1304. In addition, interaction between individuals and nodes in the appliance group/sub-group 1300 may be enabled through individual (household) accounts 1308. Interactions with authorized non-members may also occur through cloud 1312 communication channels or other networking paths utilized by the appliance group/sub-group 1300.

With respect to certain contemplated social appliances 1302 such as smoke detectors, carbon dioxide detectors, alarm system systems and other security devices, automated SNET functionality may be implemented to place automated calls or notifications to family members or emergency response entities (fire departments, law enforcement personnel, etc.) following detection of a safety event. Nearby residences may likewise receive such notifications.

When a new social appliance 1302 joins an appliance group/sub-group 1300, the SNET processing circuitry/software 1304 or like functionality may determine the model/sub-model of the appliance, deliver software updates, configure operational modes, etc. Further, the appliance may receive or provide profile information relating to the appliance or other members of the appliance group/sub-group 1300. Bidirectional communications with an appliance SNET group may occur through a powerline/phoneline/cable plant communication system (e.g., via Internet pathways, power company powerlines, or other specified communication pathways). Smart grid functionality and interactions may similarly be conducted through Zigbee, WiFi, NFC, LTE, IMT-Advanced/4G and/or other applicable protocols.

Figure 14:
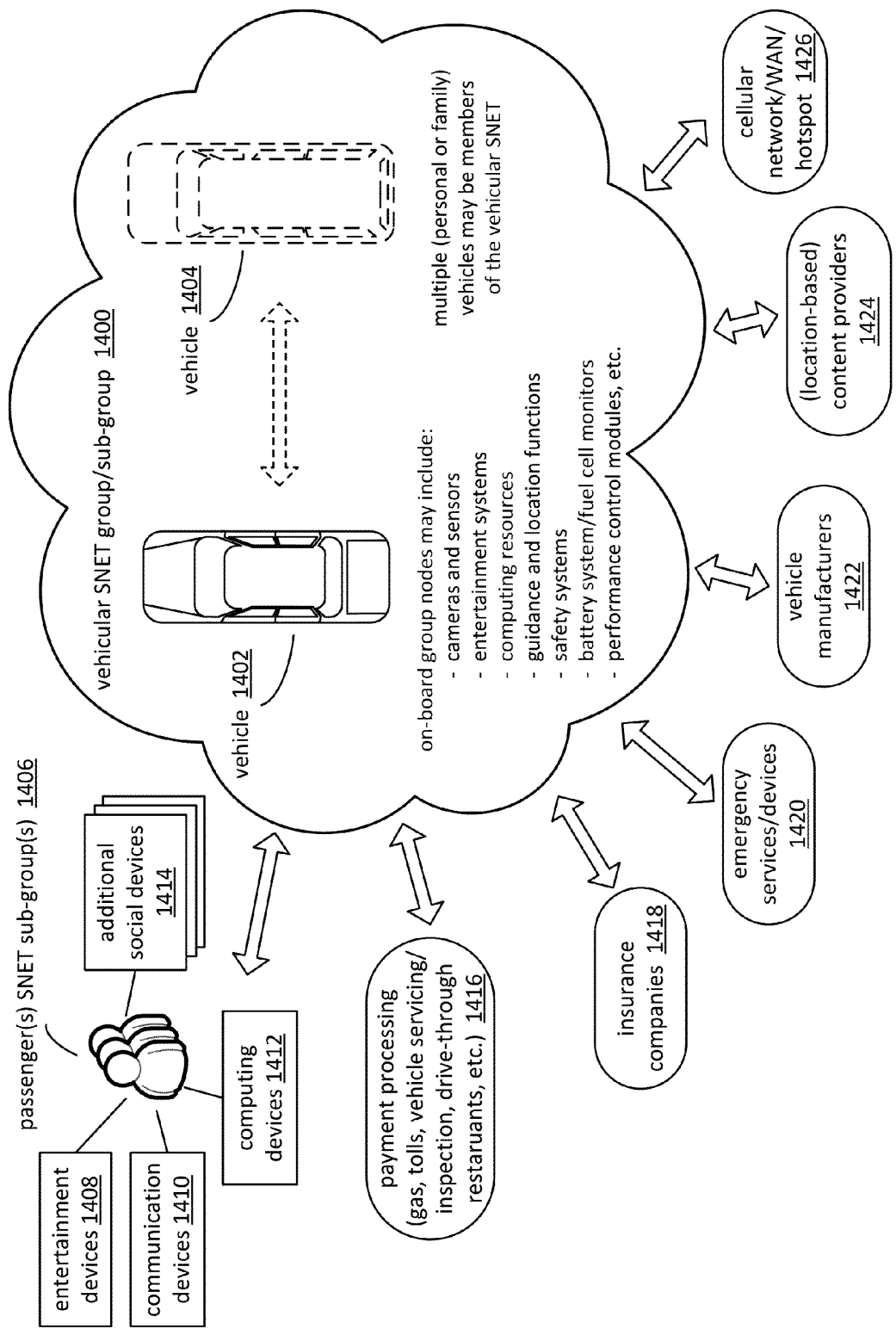
FIG. 14 illustrates a vehicular social network group/sub-group according to various embodiments of the disclosure.

FIG. 14 illustrates various embodiments of a vehicular SNET group/sub-group 1406 in accordance with the disclosure. The SNET group/sub-group 1406 includes a vehicle 1402, and may further include one or more additional vehicles 1404, such as co-owned or family vehicles. Various other devices, SNET sub-groups, service and content providers, providers, entities, may participate in the in the vehicular SNET group/sub-group 1406. In another embodiment, a vehicular SNET sub-group 1400 may itself join another SNET group (e.g., an owner or passenger SNET group).

More particularly, membership in the vehicular SNET group/sub-group 1406 may comprise a passenger SNET sub-group 1406 comprised of a human member and associated entertainment devices 1408, communication devices 1410, computing devices 1412 and additional social devices 1414. Other participants might include, for example, payment processing services 1416 (for automated remunerations for gas, tolls, vehicle servicing/inspection, drive-through restaurants, etc.), insurance companies 1418, emergency services/devices 1420, vehicle manufacturers 1422, and (location-based) content providers 1424. Various nodes of vehicular SNET group/sub-group 1406 may include interfaces for communications through a cellular network, WAN or mobile hotpot 1426 and the like. Various usage models include, for example, proximity-based activation of SNET group nodes such as garage door openers, environmental controls, etc. In addition, an insurance company may participate in order to, for example, view and verify driving behavior histories/data and possibly offer discounts relating to same.

A vehicle 1402 according to the disclosure may be an automobile, bus, train, industrial or agricultural vehicle, ship, or aircraft. Vehicular nodes/modules in accordance with the disclosure may control specific components relating to respective functionality. Such on-board group nodes may include, for example, cameras and sensors, entertainment systems, environmental controls, computing resources, guidance and location functions, safety systems, braking and suspension systems, battery system/fuel cell monitors, emissions control modules, performance/engine control modules, etc. Various such vehicle group nodes may be configured to communicate with one another.

Communications between modules and members of a vehicular SNET group/sub-group 1400 can be conducted, at least in part, over a vehicle network using a standard protocol such as Vehicle Area Network (VAN) or Controller Area Network (CAN). A number of specialized protocols have been developed and are currently employed for vehicular communications, but it is anticipated that many of these protocols will eventually be displaced by more conventional networking technologies such as Ethernet and TCP/IP. Communications in a vehicular SNET group/sub-group 1400 may employ wireless communication technologies, and/or physical transmission media such as single wire and twisted pair cabling, fiber optics, power line communications (e.g., power grid connections via a charging station for battery powered vehicles), etc.

Figure 15:
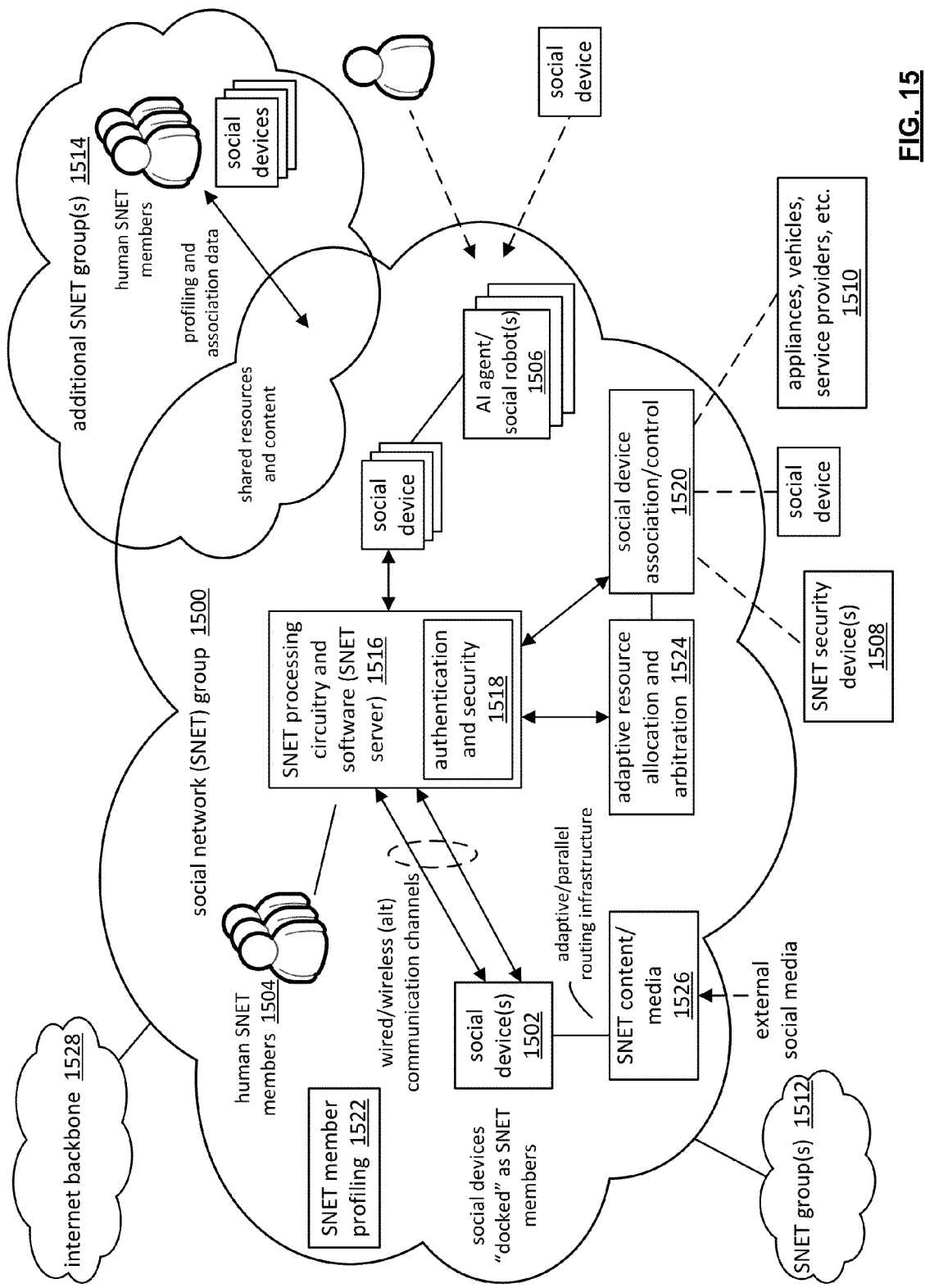
FIG. 15 illustrates an embodiment of a social networking environment according to various embodiments of the disclosure.

Referring to FIG. 15, a social network circle/group 1500 (hereinafter "SNET group") comprising social devices 1502 is shown. Beyond traditional social networking features and services, an SNET group 1500 and associated social devices 1502 according to various embodiments of the disclosure include numerous novel features and attributes as described more fully below with general reference to the illustration.

Briefly, membership in the SNET group 1500 may comprise docked social devices 1502 and human SNET members 1504, as well as proxies thereof. Further, SNET group 1500 nodes may include device services and software (e.g., applications) of various types participating as members. By way of example, SNET members might include artificial intelligence agents/social robots 1506, SNET security device(s) 1508, appliances, vehicles and service providers 1510, common or authorized members/functionality of other SNET group 1512, etc. Further, access to specific content and resources of an SNET group 1500 may be shared with members of additional SNET(s) or SNET group(s) 1514, including remote or web-based applications. Such access can be conditioned on acceptable profiling and association data. Similarly, social devices or individuals may be granted temporary or ad hoc memberships, with or without restricted access.

In the illustrated embodiment, formation, maintenance and operation of SNET group 1500 is performed by standalone or distributed SNET processing circuitry and software 1516. It is noted that the "SNET processing circuitry" may comprise hardware, software, applications, or various combinations thereof, and be configurable to support various functionalities disclosed herein. Further, the SNET processing circuitry 1516 may be included in a standalone server, cloud-based resources, and/or the various types of devices described below, and incorporate authentication and security functionality 1518. In addition, specialized middleware may also be utilized by SNETs according to the disclosure, including standardized middleware with an associated certification process, one or more proxy elements, some combination thereof, and the like. Interactions and interdependencies within the SNET group 1500 may involve one or more of a social device association/control module 1520, an SNET member profiling module 1522, and an adaptive resource allocation and arbitration module 1524 as described more fully below.

Distribution of internal and external SNET content/media 1526 can be accomplished in a variety of ways in accordance with various embodiments of the disclosure. For example, media distribution may involve an adaptive or parallel network routing infrastructure involving a wide variety of communication protocols and wired and/or wireless communications channels. SNET content/media 1526 may comprise, for example, various user-driven (advertising) channels, pictures, videos, links, online text, etc. Access to such content, as well as communications with and remote access to social devices 1502 of the SNET group 1500, may occur over an Internet backbone 1528, cellular communication system, WAN, LAN, etc.

Figure 16:
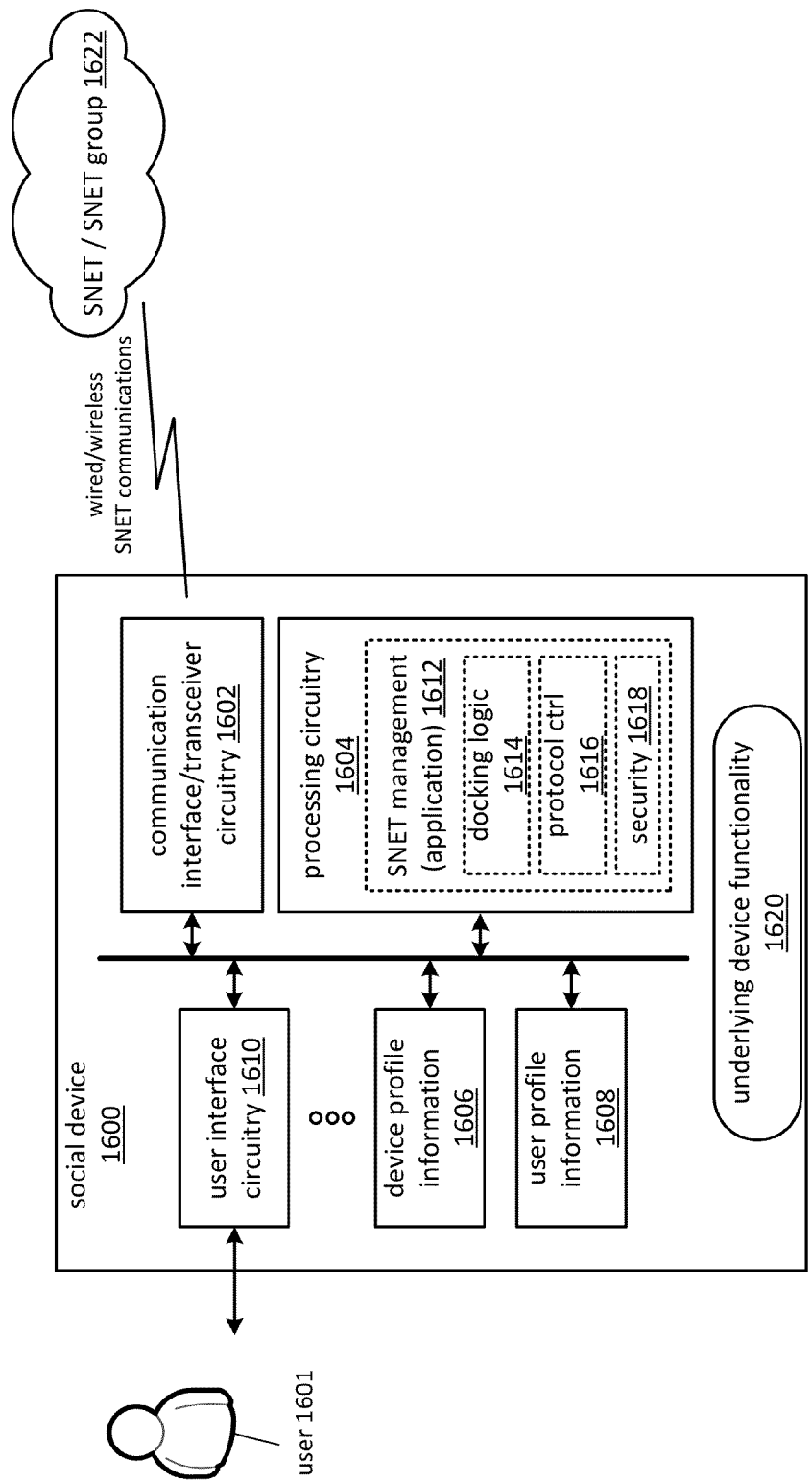
FIG. 16 illustrates a social device according to various embodiments of the disclosure.

FIG. 16 is a schematic block diagram of an exemplary social device 1600 comprising integral functionality operable to support SNET/SNET group membership and communications according to various embodiments of the disclosure. In the illustrated embodiment, a communication interface and transceiver circuitry 1602 is operable to perform wired or wireless communications between the social device 1600 and an SNET/SNET group 1622 over one or more communication channels. Depending on the capabilities and configuration of the social device 1600, communications with an SNET may be unilateral or bidirectional/interactive, and utilize either a proprietary or standardized communication protocol.

The social device 1600 further includes processing circuitry 1604 operable to process and manage communications, services and associations between the device and other entities including members of an SNET/SNET group 1622, third parties, software agents, etc. More particularly, the processing circuitry 1604 may include, for example, a SNET management application 1612 comprising one or more of docking logic 1614, communication protocol control 1616 and security/authentication functionality 1618.

The social device 1600 further may utilize that may take many forms and be maintained in static or dynamic memory. Such profile information enables a social device and/or user 1601 to present an image of itself and its capabilities to other members of an SNET. As described more fully below, device and user profile information 1606 and 1608 may be utilized in various ways according to various embodiments of the disclosure to facilitate a variety of social interactions. Depending on the capabilities and requirements of a particular device (and other members of an SNET), a device or user profile may be static or dynamic.

In certain embodiments, the social device 1600 may interact with a user(s) 1601 via user interface circuitry 1610. User input to the social device 1600 may include, for example, data entry through a keypad, touchscreen, remote control device, gaming controller, device control buttons, voice or gesture commands, storage device, etc. Authorized access to or control of the social device 1600 can be facilitated through unique biometric identifiers, passwords, token-based identification, trusted authorities or documents such as a driver's license or passport, and like authentication means.

The social device 1600 may perform core or underlying functionality 1620, various examples of which are described herein. Alternatively, the social device may primarily function as a social networking interface or communication device, or be programmable to perform specific functions within an SNET/SNET group/SNET sub-group.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An ad hoc social infrastructure comprising:
a social server, wherein the social server stores a plurality of social networking groups associated with at least one member and supports ad hoc membership of a first of a plurality of social networking groups;
a first device supporting a member, the member being associated with the first of a plurality of social networking groups;
a second device supporting a nonmember, wherein the second device enables the nonmember to become an ad hoc member of the first of the plurality of social networking groups for a period of time;
wherein the first device is configured to push, from the first device to the second device, a unique identifier associated with the first of the plurality of social networking groups and a user selectable link configured to connect the second device to the first of the plurality of social networking groups upon selection of the link; and
a proxy supporting varying levels of readdressing based on social networking group membership, wherein:
data transfers from the first device to the second device use direct packet routing; and
data transfers from the second device to the first device flow through the proxy.

2. The ad hoc infrastructure of claim 1, wherein the proxy is further configured to update changes associated with an access level of the ad hoc member, wherein the changes are transparent to at least some other social networking group members.

3. The ad hoc infrastructure of claim 1, the second device enables the nonmember to become an ad hoc member of the first of the plurality of social networking groups for a period of time by interacting indirectly with the first device via an access point.

4. The ad hoc infrastructure of claim 1, the first of the plurality of social networking groups enables access to at least one element selected from a group consisting of:
gaming activities,
gambling activities,
travel activities, and
content item sharing.

5. The ad hoc infrastructure of claim 2, wherein the changes associated with an access level of the ad hoc member include losing at least some access associated with being an ad hoc member of the first of the plurality of social networking groups in response to a trigger event.

6. A device that interacts with a social network to support at least one nonmember device, the social network having a social networking group, the device comprising:
a user selectable input configured to be actuated by a user;
memory configured to store a unique identifier, the unique identifier uniquely identifying the social networking group; and processing circuitry configured to:
  receive the unique identifier;
  in response to the user selectable input being activated, push an invitation from the device to a nonmember, via the nonmember device, the invitation enabling the nonmember to become an ad hoc member of the social networking group for a period of time, wherein the invitation includes the unique identifier associated with the social networking group and a user selectable link configured to connect the nonmember device to the social networking group in response to selection of the link;
  wherein the nonmember device is coupled to the social networking group via a proxy supporting varying levels of anonymity based on information included in an anonymity database; and
  the processing circuitry further configured to route data to the nonmember device using direct packet routing, and to route attempts to access information associated with the social networking group by at least one ad hoc member through the proxy.

7. The device of claim 6, the processing circuitry further configured to transmit the invitation to the nonmember independently of the social network.

8. The device of claim 6, the processing circuitry further configured to transmit the invitation to the nonmember independently of the social network in response to determining that the nonmember device has crossed a location threshold.

9. The device of claim 8, the processing circuitry further configured to terminate at least some aspects of membership of the ad hoc member in the social networking group in response to determining that the nonmember device has crossed a location threshold.

10. The device of claim 6, the processing circuitry further configured to remove the nonmember as an ad hoc member of social networking group after the period of time has elapsed.

11. The device of claim 6, the invitation including the unique identifier uniquely identifying the social networking group.

12. The device of claim 6, wherein the proxy is further configured to update changes associated with an access level of the ad hoc member.

13. A method that supports participation in a social networking group by a nonmember of the social networking group, the method comprising:
  receiving, from a device associated with a particular member of the social networking group, an invitation to join the social networking group as an ad hoc member, the invitation received at a nonmember device via a pathway that is independent of a social network, wherein the invitation includes a unique identifier uniquely identifying the social networking group and a user selectable link configured to connect the nonmember device to the social networking group upon selection of the link;
  accepting the invitation, via an acceptance process, to become an ad hoc member of the social networking group for a period of time, the acceptance process including providing information to another device; and
  wherein data transfers from the device to the nonmember device use direct packet routing; and data transfers from the nonmember device to the device flow through a proxy that applies substitute addressing and forwarding to said data transfers from the nonmember device to the device.

14. The method of claim 13, wherein:
  the acceptance process includes selecting the link and providing the unique identifier to another device associated with the social networking group.

15. The method of claim 13, the invitation is received via an access point, and the acceptance process includes interacting with an access point.

16. The method of claim 13 comprising, in response to becoming an ad hoc member of the social networking group for a period of time, gaining access to at least some information associated with the social networking group.

17. The method of claim 16, the at least some information includes access to at least some functionality associated with a device.

18. The method of claim 16, the access to at least some information is routed through the proxy employing an anonymity database.

19. The method of claim 18, the at least some information is contact information associated with at least one member of the social networking group, and the substitute addressing enables communication with the at least one member routed through the proxy.

20. The method of claim 13 comprising losing at least some access associated with being an ad hoc member of the social networking group in response to a trigger event.

* * * * *